US012683289B2

(12) United States Patent
Lee et al.

(10) Patent No.: US 12,683,289 B2
(45) Date of Patent: Jul. 14, 2026

(54) ANTENNA DEVICE

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventors: Jungaun Lee, Nisshin (JP); Toshihiko Takahata, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 40 days.

(21) Appl. No.: 18/815,012

(22) Filed: Aug. 26, 2024

(65) Prior Publication Data

US 2025/0174906 A1 May 29, 2025

(30) Foreign Application Priority Data

Nov. 23, 2023 (JP) ................................ 2023-198725

(51) Int. Cl.
*H01Q 15/24* (2006.01)
*H01Q 13/22* (2006.01)

(52) U.S. Cl.
CPC .......... *H01Q 15/242* (2013.01); *H01Q 13/22* (2013.01)

(58) Field of Classification Search
CPC ....... H01Q 13/02-06; H01Q 13/20-22; H01Q 21/0043-005; H01Q 15/24
See application file for complete search history.

(56) References Cited

U.S. PATENT DOCUMENTS

| | | | | |
|---|---|---|---|---|
| 10,020,591 | B2 * | 7/2018 | Uemichi ................ | H01Q 13/22 |
| 10,840,605 | B2 * | 11/2020 | Hollenbeck .......... | H01Q 21/064 |
| 10,985,472 | B2 * | 4/2021 | Moon .................. | H01Q 15/246 |
| 2018/0351261 | A1 * | 12/2018 | Kamo .................. | H01Q 21/064 |
| 2023/0420857 | A1 | 12/2023 | Garcia Tejero et al. | |

* cited by examiner

*Primary Examiner* — Hasan Islam
(74) *Attorney, Agent, or Firm* — Posz Law Group, PLC

(57) ABSTRACT

An antenna device includes a polarization conversion unit in which a conversion space is formed to propagate radio wave. A first waveguide extends from the conversion space to one side in a longitudinal direction, and a second waveguide extends from the conversion space to the other side in the longitudinal direction. The first waveguide is extended in a height direction in a cross-section perpendicular to the longitudinal direction, and a second waveguide is extended in a width direction in the cross-section. Plural antenna apertures are connected to the second waveguide.

9 Claims, 30 Drawing Sheets

ANTENNA DEVICE

CROSS REFERENCE TO RELATED APPLICATION

This application is based on Japanese Patent Application No. 2023-198725 filed on Nov. 23, 2023, the disclosure of which is incorporated herein by reference.

TECHNICAL FIELD

The present disclosure relates to an antenna device that includes a waveguide.

BACKGROUND

An antenna device has plural antenna apertures to radiate radio waves, and the antenna apertures are arranged side by side in one direction.

SUMMARY

An antenna device according to one aspect of the present disclosure includes: a polarization conversion unit in which a conversion space is formed to propagate radio wave; a first waveguide section in which a first waveguide is formed to propagate radio wave, the first waveguide being connected to the conversion space from one side in a first direction and extending from the conversion space to the one side in the first direction; and a second waveguide section in which a second waveguide and antenna apertures are formed. The second waveguide is connected to the conversion space from the other side in the first direction and extends from the conversion space to the other side in the first direction so as to propagate the radio wave. The antenna apertures are connected to the second waveguide from one side in a second direction perpendicular to the first direction. The antenna apertures are arranged side by side in the first direction and open to an external space by facing the one side in the second direction. The conversion space has one end provided on the one side in the first direction and connected to the first waveguide, and the other end provided on the other side in the first direction and connected to the second waveguide. The polarization conversion unit propagates the radio wave between the one end and the other end of the conversion space, and changes an oscillation direction of electric field of the radio wave so that the electric field of the radio wave oscillates in a third direction perpendicular to the first direction and the second direction at the one end of the conversion space and oscillates in the second direction at the other end of the conversion space. The first waveguide has a shape extended in the second direction in a cross-section perpendicular to the first direction. The second waveguide has a shape extended in the third direction in the cross-section.

DETAILED DESCRIPTION

Figure 1:
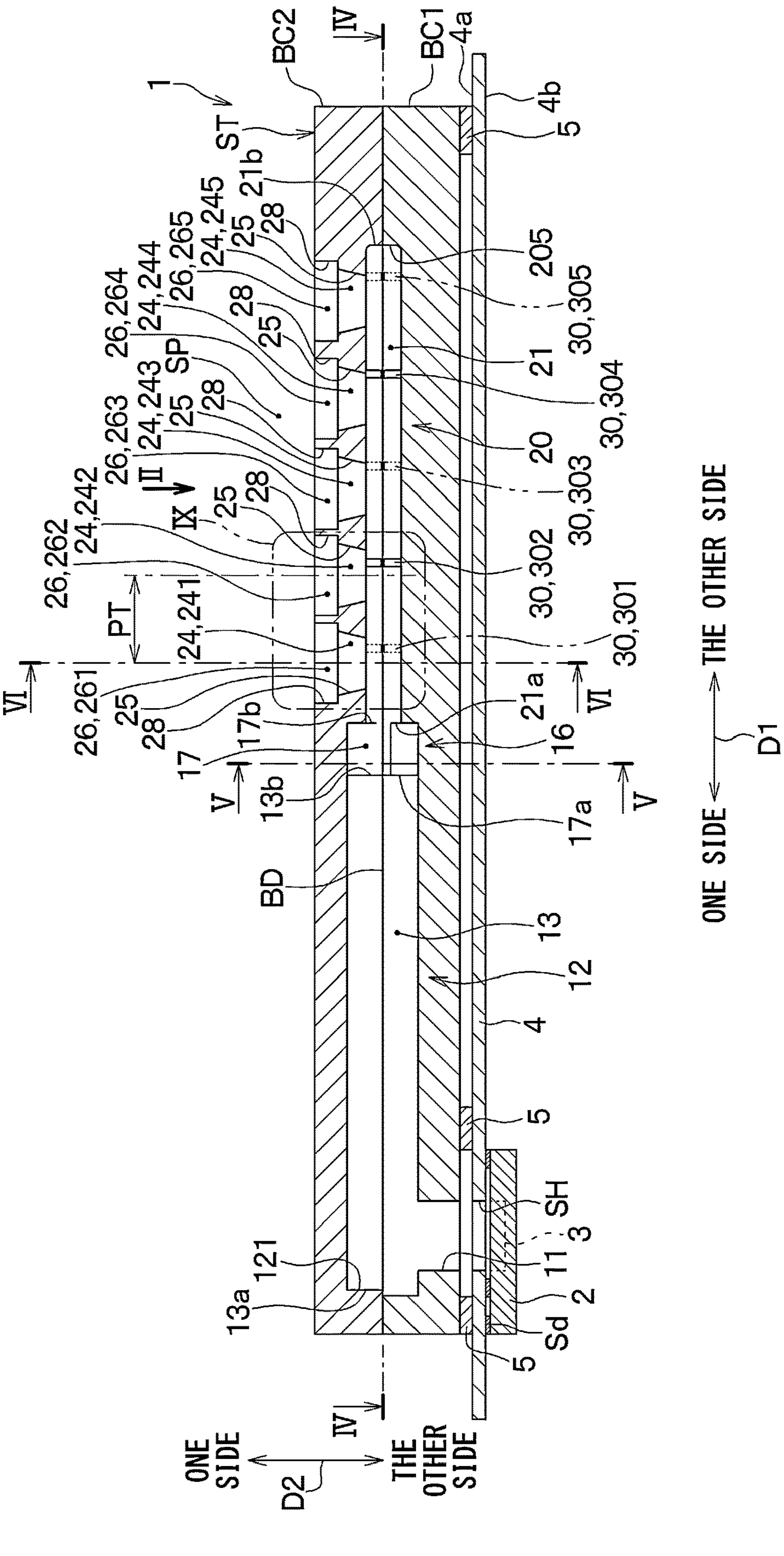
FIG. 1 is a schematic cross-sectional view showing an antenna device according to a first embodiment.

An antenna device has plural antenna apertures to radiate radio waves, and the antenna apertures are arranged side by side in one direction. A waveguide connects the antenna apertures to a source of radio waves, and is connected, via a distributor, to the array of the antenna apertures in a lateral direction perpendicular to the one direction.

The waveguide is connected to the array of the antenna apertures in the lateral direction via the distributor. This causes the combination of the antenna apertures and the waveguide to occupy a large width in the lateral direction, in other words, causes the size of the antenna device to increase in the lateral direction. The above has been found as a result of detailed studies by the inventors.

The present disclosure provides an antenna device in which a large number of antenna apertures can be easily provided while suppressing an increase in size in the lateral direction.

An antenna device according to one aspect of the present disclosure includes: a polarization conversion unit in which a conversion space is formed to propagate radio wave; a first waveguide section in which a first waveguide is formed to propagate radio wave, the first waveguide being connected to the conversion space from one side in a first direction and extending from the conversion space to the one side in the first direction; and a second waveguide section in which a second waveguide and antenna apertures are formed. The second waveguide is connected to the conversion space from the other side in the first direction and extends from the conversion space to the other side in the first direction so as to propagate the radio wave. The antenna apertures are connected to the second waveguide from one side in a second direction perpendicular to the first direction. The antenna apertures are arranged side by side in the first direction and open to an external space by facing the one side in the second direction. The conversion space has one end provided on the one side in the first direction and connected to the first waveguide, and the other end provided on the other side in the first direction and connected to the second waveguide. The polarization conversion unit propagates the radio wave between the one end and the other end of the conversion space, and changes an oscillation direction of electric field of the radio wave so that the electric field of the radio wave oscillates in a third direction perpendicular to the first direction and the second direction at the one end of the conversion space and oscillates in the second direction at the other end of the conversion space. The first waveguide has a shape extended in the second direction in a cross-section perpendicular to the first direction. The second waveguide has a shape extended in the third direction in the cross-section.

In this way, the first waveguide is provided on the one side in the first direction with respect to the antenna apertures. Therefore, the relative positional relationship of the first waveguide with respect to the antenna apertures is unlikely to cause an increase in the size of the antenna device in the third direction, which corresponds to the lateral direction. Therefore, it is possible to suppress the size of the antenna device from increasing in the third direction. Furthermore, since the antenna apertures are connected to the second waveguide, it is easy to provide a large number of antenna apertures according to the length of the second waveguide in the first direction without expanding the size of the antenna device in the third direction.

Hereinafter, embodiments will be described with reference to the drawings. In the following embodiments, the same reference numeral is given to the same or equivalent parts in the drawings.

First Embodiment

Figure 2:
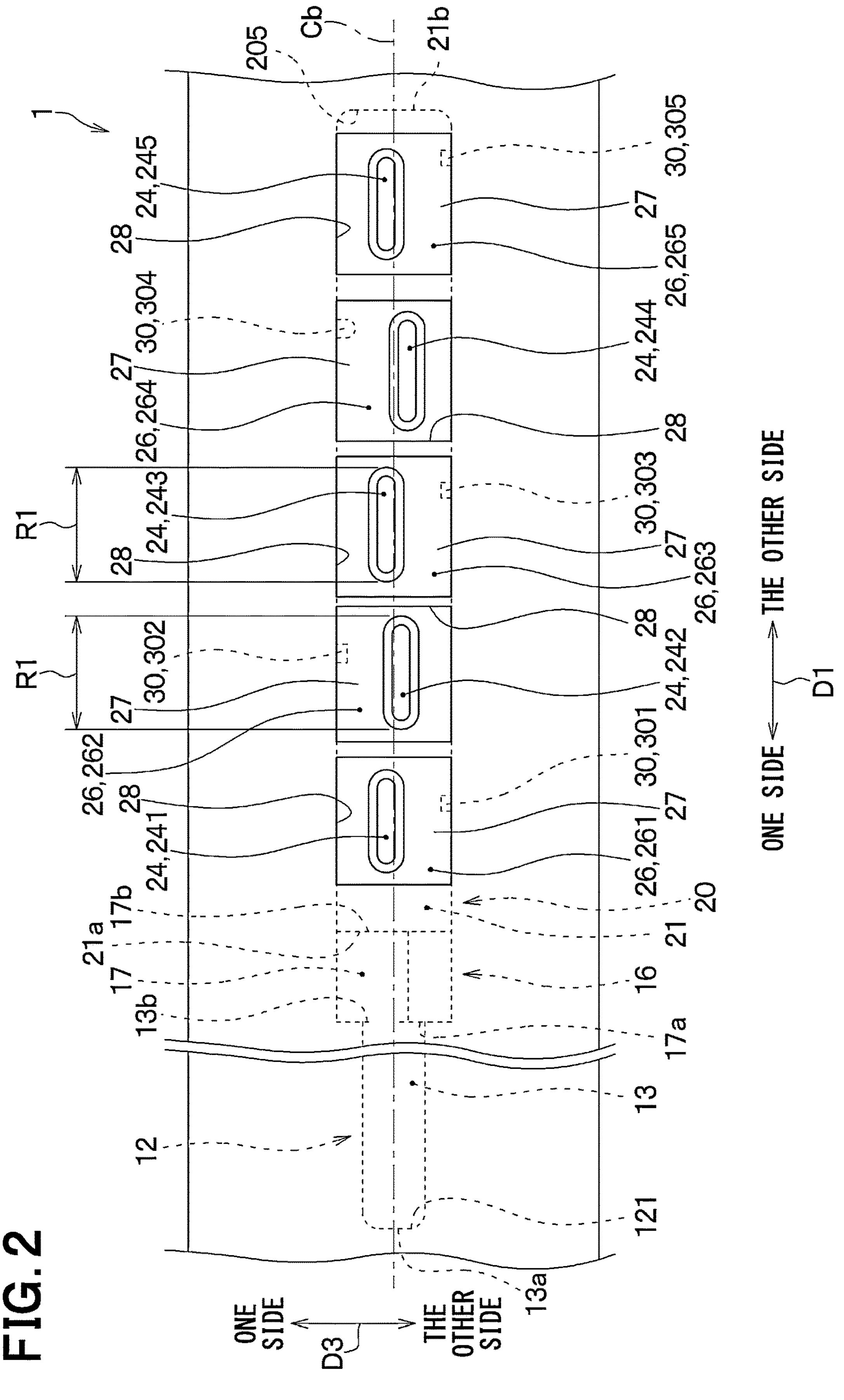
FIG. 2 is a plan view of the antenna device according to the first embodiment seen in an arrow direction II in FIG. 1.
Figure 3:
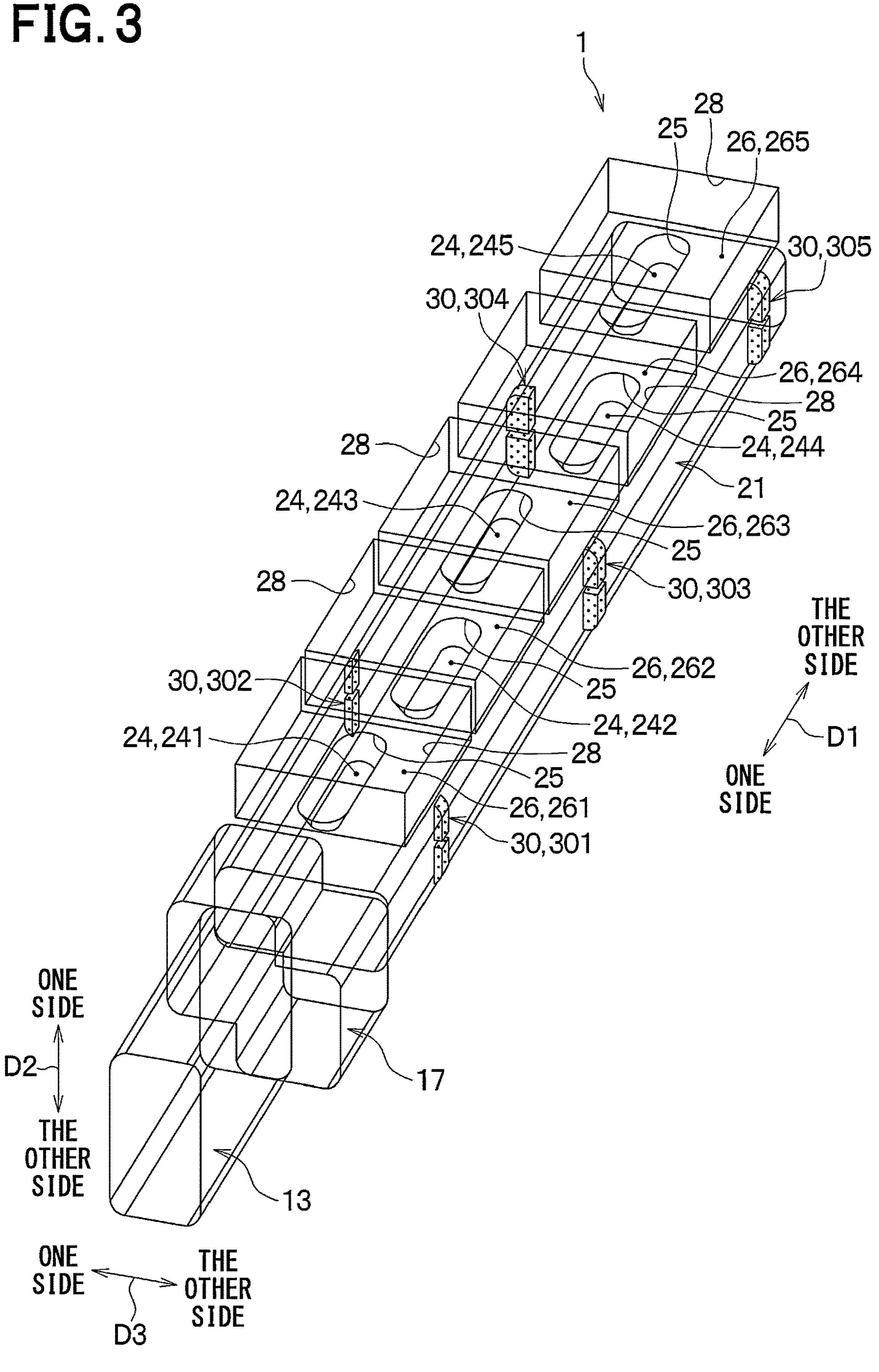
FIG. 3 is a perspective view of the antenna device according to the first embodiment, in which a part of a first waveguide, a conversion space, a second waveguide, antenna apertures, an open space, and a reflection suppressing wall are illustrated in wire frame.

In this embodiment, as shown in FIGS. 1 to 3, an antenna device 1 is applied to an apparatus including a monolithic microwave integrated circuit (MMIC) 2 which is an electrical component.

In this embodiment, a longitudinal direction D1, a height direction D2, and a width direction D3 shown in FIGS. 1 to 3 may be used to indicate the orientation of the antenna device 1. The longitudinal direction D1, the height direction D2, and the width direction D3 intersect with one another, or more precisely, are perpendicular to one another. In this embodiment, the longitudinal direction D1 corresponds to a first direction, the height direction D2 corresponds to a second direction, and the width direction D3 corresponds to a third direction. In FIGS. 3, 10, 18, 19, 23, and 25, hidden line removal has not been performed, and hidden lines are displayed as solid lines in the same manner as outlines.

The MMIC 2 is a semiconductor device including an input/output unit 3 for transmitting and receiving radio waves. The MMIC 2 is a transmitting/receiving device provided in correspondence with the antenna device 1. In this embodiment, the operating frequency of the radio waves transmitted and received by the MMIC 2 is set to a frequency band corresponding to millimeter waves. The operating frequency of radio waves transmitted and received by the MMIC 2 is not limited to frequencies corresponding to millimeter waves, and may be frequencies other than millimeter waves.

The electric board 4 is a printed circuit board on which wiring patterns are formed using a conductive member such as metal foil. The thickness direction of the electric board 4 coincides with the height direction D2. The electric board 4 has one surface 4*a* on one side in the height direction D2, and the other surface 4*b* on the other side in the height direction D2. The MMIC 2 is mounted on the other surface 4*b* of the electric board 4. A through hole SH is formed in the electric board 4 at a position facing the input/output unit 3 of the MMIC 2, and passes through the electric board 4 in the height direction D2. FIG. 1 illustrates a solder Sd for joining the MMIC 2 to the other surface 4*b* of the electric board 4.

Plural spacers 5 are disposed on the one surface 4*a* of the electric board 4. The spacer 5 is made of, for example, a conductive material. The spacer 5 is fixed to the electric board 4.

The antenna device 1 is disposed on the one surface 4*a* of the electric board 4 with the spacers 5 interposed therebetween. The antenna device 1 is fixed to the electric board 4 by screw, adhesive or the like while being in contact with each of the spacers 5.

The antenna device 1 is an antenna that transmits radio waves transmitted and received by the MMIC 2. The antenna device 1 includes a structural body ST having a stacked structure in which two conductive blocks BC1 and BC2 are stacked in the height direction D2. The blocks BC1 and BC2 are made of metal.

At least one of the two blocks BC1, BC2 may not be a metal block, but may be, for example, a resin block having a conductive film such as a metal film formed on the surface thereof by plating or the like, or a block made of a conductive material other than metal.

The antenna device 1 has the two blocks BC1 and BC2, and the two blocks BC1 and BC2 are joined to each other by screwing, adhesive, or the like. The antenna device 1 is fixed to the electric board 4 in such a position that the height direction D2 coincides with the thickness direction of the electric board 4.

The two blocks BC1 and BC2 of the antenna device 1 are specifically a first block BC1 and a second block BC2. The first block BC1 and the second block BC2 are stacked in this order from the side closer to the electric board 4, that is, from the other side in the height direction D2.

Figure 4:
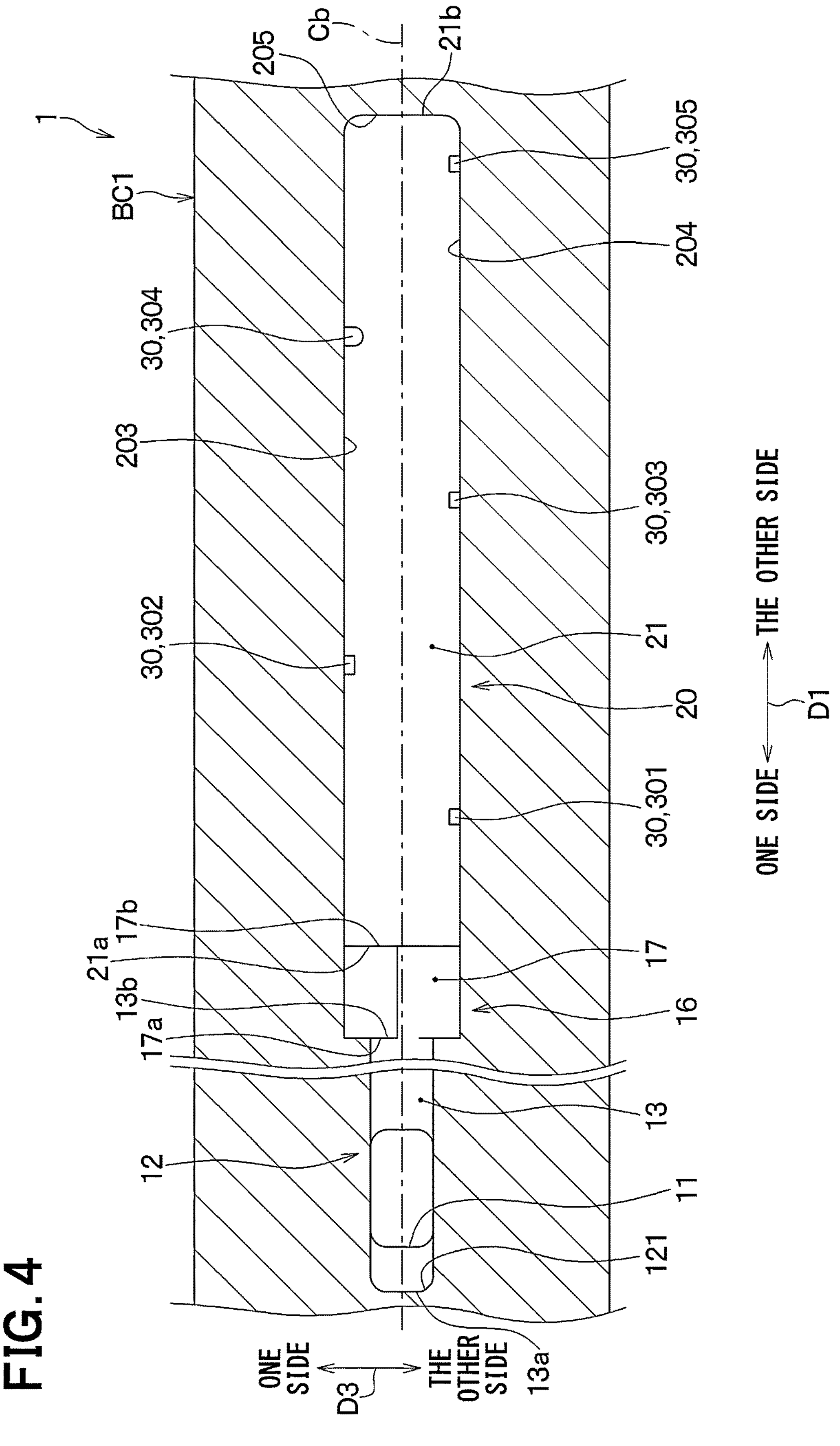
FIG. 4 is a schematic cross-sectional view taken along line IV-IV in FIG. 1, including a plan view of a first block in the antenna device of the first embodiment.

As shown in FIGS. 1, 2 and 4, the two blocks BC1 and BC2 have the same rectangular shape in a plan view that is viewed in a direction along the height direction D2. The two blocks BC1, BC2 are approximately the same size in a plan view so as to overlap each other in the height direction D2.

The first block BC1 and the second block BC2 have opposing surfaces that are in contact with each other. As a result, the two blocks BC1 and BC2 are electrically connected with each other.

The first block BC1 has a surface on the other side in the height direction D2 opposed to the one surface 4*a* of the electric board 4 with the spacers 5 interposed therebetween. Although not shown, the first block BC1 is electrically connected to a ground pattern included in the wiring pattern formed on the one surface 4*a* of the electric board 4 via at least some of the spacers 5. The second block BC2 is electrically connected to the first block BC1, and is therefore electrically connected to the ground pattern of the electric board 4 via the first block BC1. The ground pattern of the electric board 4 is at ground potential.

From a functional perspective, the antenna device 1 includes an external port 11, a first waveguide section 12, a polarization conversion unit 16, and a second waveguide section 20. The external port 11 is provided in the first block BC1. Each of the first waveguide section 12, the polarization conversion unit 16 and the second waveguide section 20 is provided across the first block BC1 and the second block BC2.

The external port 11 is formed in the first block BC1 as an opening hole that opens to the other side in the height direction D2, and is provided so that radio waves can propagate between the external port 11 and the MMIC 2. The external port 11 is formed in the first block BC1 at a position facing the input/output unit 3 of the MMIC 2 with the through hole SH between the input/output unit 3 and the external port 11. This allows radio waves to propagate between the external port 11 and the MMIC 2.

The first waveguide section 12 is included in a waveguide that serves as a propagation path for radio waves between the MMIC 2 and the polarization conversion unit 16. In this embodiment, since the external port 11 opens to the first waveguide section 12, the entirety of the first waveguide section 12 serves as a waveguide between the MMIC 2 and the polarization conversion unit 16.

A first waveguide 13 is formed inside the first waveguide section 12 and extends in the longitudinal direction D1 to propagate radio waves. The first waveguide 13 is formed between the first block BC1 and the second block BC2 as a cavity extending in the longitudinal direction D1. In this embodiment, the boundary BD between the first block BC1 and the second block BC2 is located at the middle of the range occupied by the first waveguide 13 in the height direction D2. The first waveguide 13 has one end 13*a* on one side in the longitudinal direction D1, and the other end 13*b* provided on the other side in the longitudinal direction D1. In FIG. 3, the external port 11 and the peripheral portion of the first waveguide 13 around the external port 11 are omitted.

The first waveguide 13 is disposed on one side of the external port 11 in the height direction D2, and the external port 11 is connected to the first waveguide 13 from the other side in the height direction D2. The external port 11 opens to the first waveguide 13 at one side of the first waveguide 13 in the longitudinal direction D1, more specifically, at a position near the one end 13*a* of the first waveguide 13. Therefore, the first waveguide 13 extends from near the external port 11 to a conversion space 17 of the polarization conversion unit 16, which will be described later.

Figure 5:
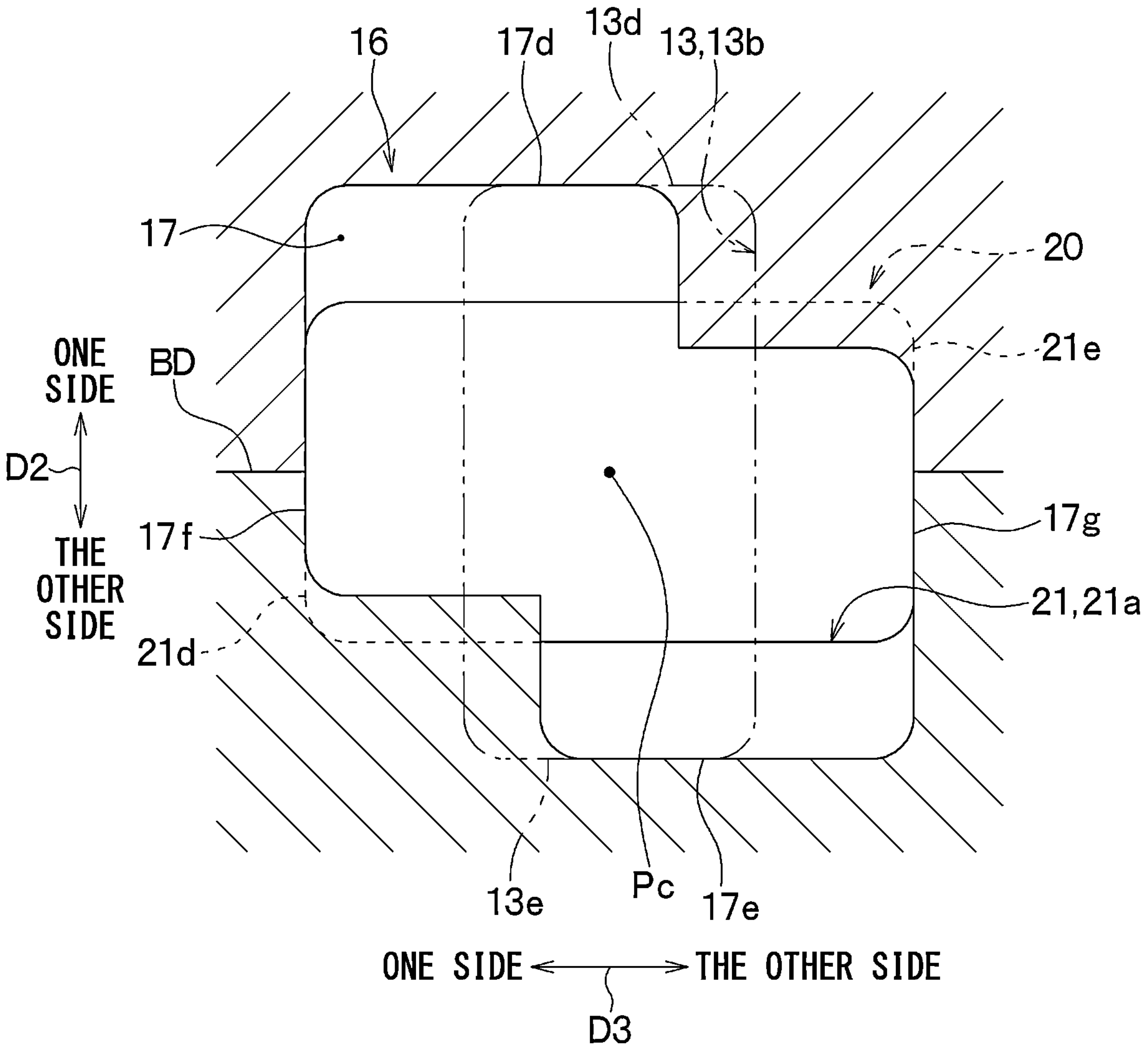
FIG. 5 is a schematic cross-sectional view taken along line V-V in FIG. 1 on which a first waveguide is superimposed.

As shown in FIGS. 3 and 5, the first waveguide 13 has a rectangular cross-section extending in the height direction D2 in a cross-section perpendicular to the longitudinal direction D1. That is, the dimension of the first waveguide 13 in the height direction D2 is greater than the dimension in the width direction D3. FIG. 5 shows a cross-section taken along line V-V of FIG. 1. Although the first waveguide 13 does not actually appear in the V-V cross section, in FIG. 5, the first waveguide 13 is shown by an imaginary two-dot chain line in order to show the relative positional relationship between the first waveguide 13 and the conversion space 17.

As shown in FIGS. 1, 2 and 4, the first waveguide section 12 has one end wall 121 provided on one side of the first waveguide section 12 in the longitudinal direction D1. The one end wall 121 faces the other side in the longitudinal direction D1 at the one end 13*a*, and is in contact with the first waveguide 13 to form the one end 13*a* which is the termination of the first waveguide 13. Therefore, the one end wall 121 is disposed near the external port 11 and located on one side of the external port 11 in the longitudinal direction D1.

The polarization conversion unit 16 is provided between the first waveguide section 12 and the second waveguide section 20 in the longitudinal direction D1. The conversion space 17 is formed inside the polarization conversion unit 16 to propagate radio waves. The conversion space 17 is formed as a cavity between the first block BC1 and the second block BC2. In this embodiment, the boundary BD between the first block BC1 and the second block BC2 is located at the middle of the range occupied by the conversion space 17 in the height direction D2. The conversion space 17 has one end 17*a* on one side in the longitudinal direction D1, and the other end 17*b* on the other side in the longitudinal direction D1.

The first waveguide 13 is connected to the one end 17*a* of the conversion space 17. In detail, the other end 13*b* of the first waveguide 13 and the one end 17*a* of the conversion space 17 are at the same position in the longitudinal direction D1 and are connected to each other. That is, the first waveguide 13 is connected to the conversion space 17 from one side in the longitudinal direction D1, and extends from the conversion space 17 to the one side in the longitudinal direction D1.

Therefore, the first waveguide 13 is connected to the MMIC 2 via the external port 11 on the side of the first waveguide 13 opposite the conversion space 17, and forms a propagation path for radio waves between the MMIC 2 and the conversion space 17. The first waveguide 13 propagates radio waves between the MMIC 2 and the conversion space 17.

The other end 17*b* of the conversion space 17 is connected to the second waveguide 21 of the second waveguide section 20, which will be described later. In detail, the one end 21*a* of the second waveguide 21 and the other end 17*b* of the conversion space 17 are at the same position in the longitudinal direction D1 and are connected to each other. The function of the polarization conversion unit 16 will be described later.

The second waveguide section 20 is configured as a waveguide that serves as a propagation path for radio waves between each of the antenna apertures 24 and the polarization conversion unit 16. The second waveguide 21 is formed inside the second waveguide section 20, and extends in the longitudinal direction D1 to propagate radio waves.

The second waveguide 21 is formed between the first block BC1 and the second block BC2 as a cavity extending in the longitudinal direction D1. In this embodiment, the boundary BD between the first block BC1 and the second block BC2 is located at the middle of the range occupied by the second waveguide 21 in the height direction D2. The second waveguide 21 has one end 21*a* on one side in the longitudinal direction D1, and the other end 21*b* on the other side in the longitudinal direction D1.

As described above, the second waveguide 21 is connected to the conversion space 17 at the one end 21*a* of the second waveguide 21. Therefore, the second waveguide 21 is connected to the conversion space 17 from the other side in the longitudinal direction D1, and extends from the conversion space 17 to the other side in the longitudinal direction D1.

Figure 6:
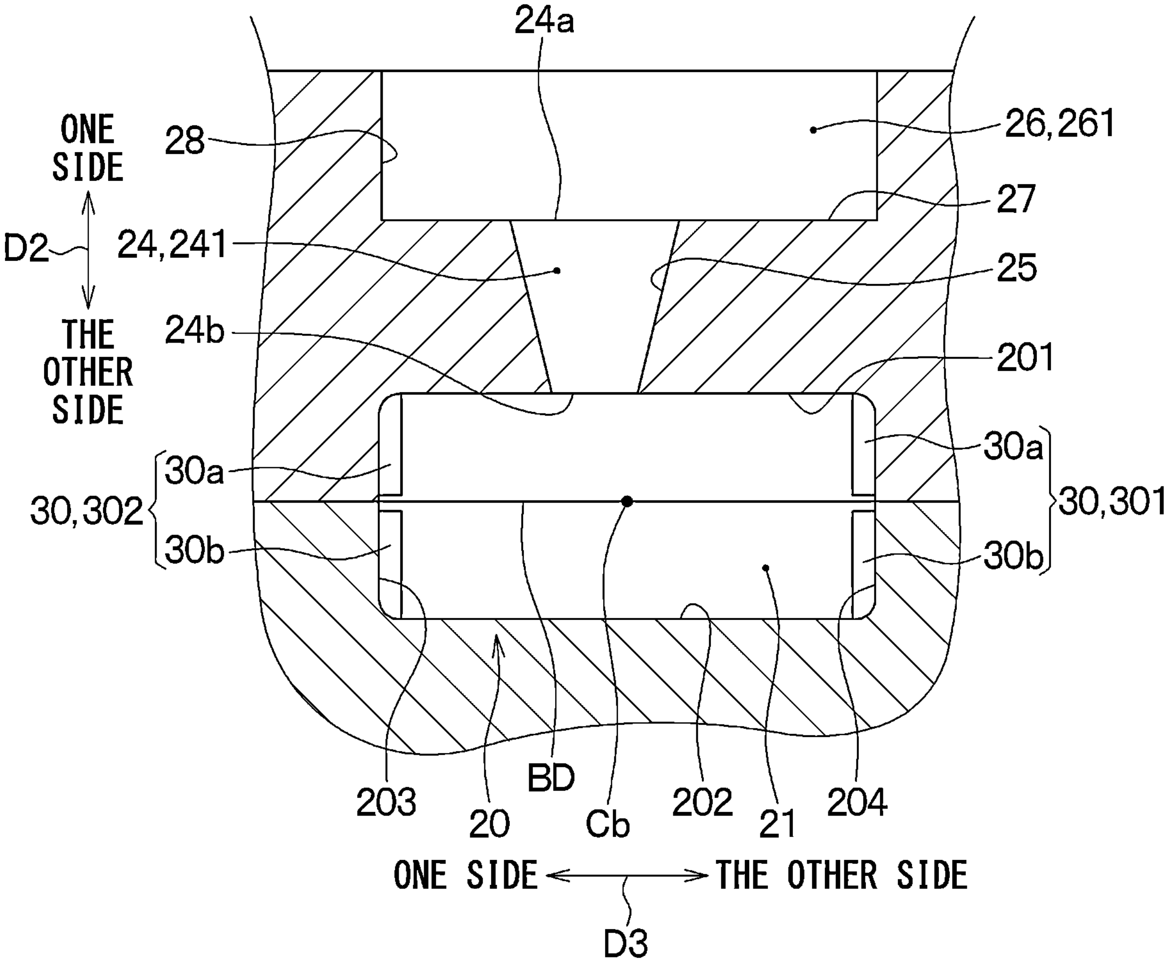
FIG. 6 is a schematic cross-sectional view taken along line VI-VI in FIG. 1.

As shown in FIGS. 3, 5 and 6, the second waveguide 21 has a rectangular shape extending in the width direction D3 in the cross section. That is, the dimension of the second waveguide 21 in the width direction D3 is greater than the dimension of the second waveguide 21 in the height direction D2.

As shown in FIG. 6, the second waveguide section 20 has first to fourth side wall surfaces 201, 202, 203, 204, which are wall surfaces of the second waveguide 21, to form the four sides of the rectangular cross-section of the second waveguide 21. Of the first to fourth side wall surfaces 201, 202, 203, 204, the first side wall surface 201 and the second side wall surface 202 are formed in a planar shape perpendicular to the height direction D2, and the third side wall surface 203 and the fourth side wall surface 204 are formed in a planar shape perpendicular to the width direction D3.

The first side wall surface 201 is provided on one side of the second waveguide 21 in the height direction D2 to face the other side of the height direction D2, and is in contact with the second waveguide 21. The second side wall surface 202 is provided on the other side of the second waveguide 21 in the height direction D2 to face the one side in the height direction D2, and is in contact with the second waveguide 21. The third side wall surface 203 is provided on one side of the second waveguide 21 in the width direction D3 to face the other side in the width direction D3, and is in contact with the second waveguide 21. The fourth side wall surface 204 is provided on the other side of the second waveguide 21 in the width direction D3 to face the one side in the width direction D3, and is in contact with the second waveguide 21.

As shown in FIGS. 1, 2 and 4, the second waveguide section 20 has the other end wall 205 provided as a short-circuit section on the other side of the second waveguide section 20 in the longitudinal direction D1. The other end wall 205 faces one side in the longitudinal direction D1 at the other end 21*b* which is the termination of the second waveguide 21, and faces and contacts the second waveguide 21 to form the other end 21*b*.

Figure 7:
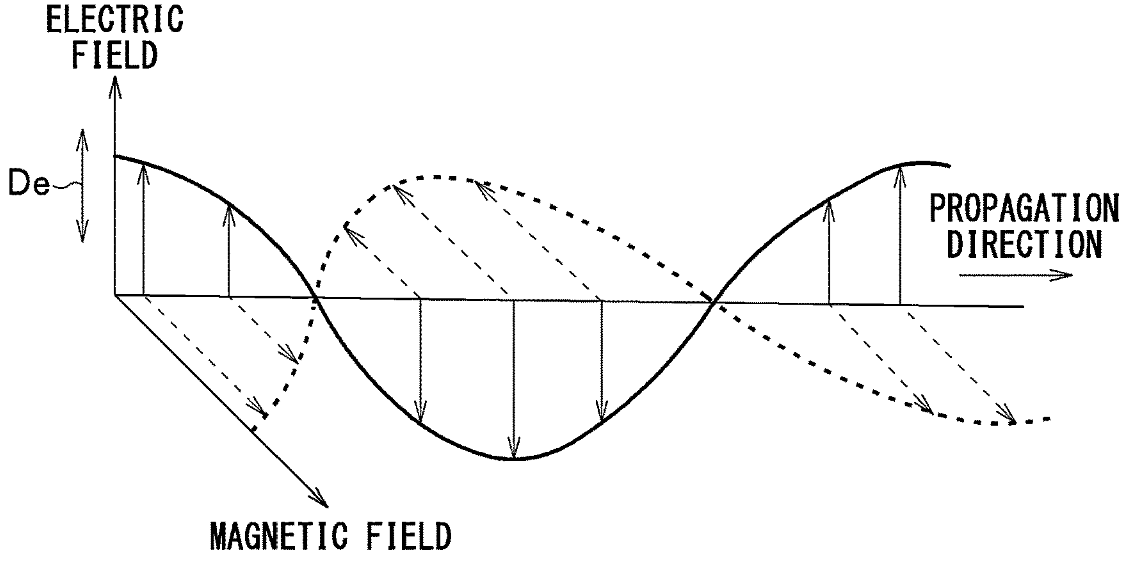
FIG. 7 is a schematic diagram showing an electric field oscillation direction of radio wave propagating through the antenna device of the first embodiment.

Here, an electric field oscillation direction De will be mentioned. The electric field of the radio waves propagating through the first waveguide 13 and the second waveguide 21 oscillate in the electric field oscillation direction De of the radio waves. The electric field oscillation direction De of the radio wave is shown by a double-headed arrow in FIG. 7. The electric field oscillation direction De of radio waves propagating in a rectangular waveguide having a rectangular cross-section is along the short side of the rectangular shape.

Therefore, as shown in FIGS. 3 and 5, in the first waveguide 13, due to the cross-sectional shape of the first waveguide 13, the electric field oscillation direction De of the radio wave is set to be a direction along the width direction D3. The radio waves in the first waveguide 13 are propagated within the first waveguide 13 while the electric field oscillation direction De of the radio waves is maintained along the width direction D3. In contrast, in the second waveguide 21, due to the cross-sectional shape of the second waveguide 21, the electric field oscillation direction De of the radio wave is aligned along the height direction D2. The radio waves in the second waveguide 21 are propagated within the second waveguide 21 while the electric field oscillation direction De of the radio waves is maintained along the height direction D2.

Therefore, as shown in FIGS. 1, 3, and 5, the polarization conversion unit 16 propagates radio waves in the conversion space 17 between the one end 17*a* to which the first waveguide 13 is connected and the other end 17*b* to which the second waveguide 21 is connected, while changing the electric field oscillation direction De of the radio waves by 90 degrees around an axis along the longitudinal direction D1.

In detail, the polarization conversion unit 16 propagates radio waves between the one end 17*a* and the other end 17*b* of the conversion space 17, and changes the electric field oscillation direction De of the radio waves. In other words, while propagating the radio waves, the polarization conversion unit 16 changes the electric field oscillation direction De of the radio waves between the one end 17*a* and the other end 17*b* of the conversion space 17 so that the electric field of the radio waves vibrates in the width direction D3 at the one end 17*a* of the conversion space 17 and vibrates in the height direction D2 at the other end 17*b* of the conversion space 17.

Figure 8:
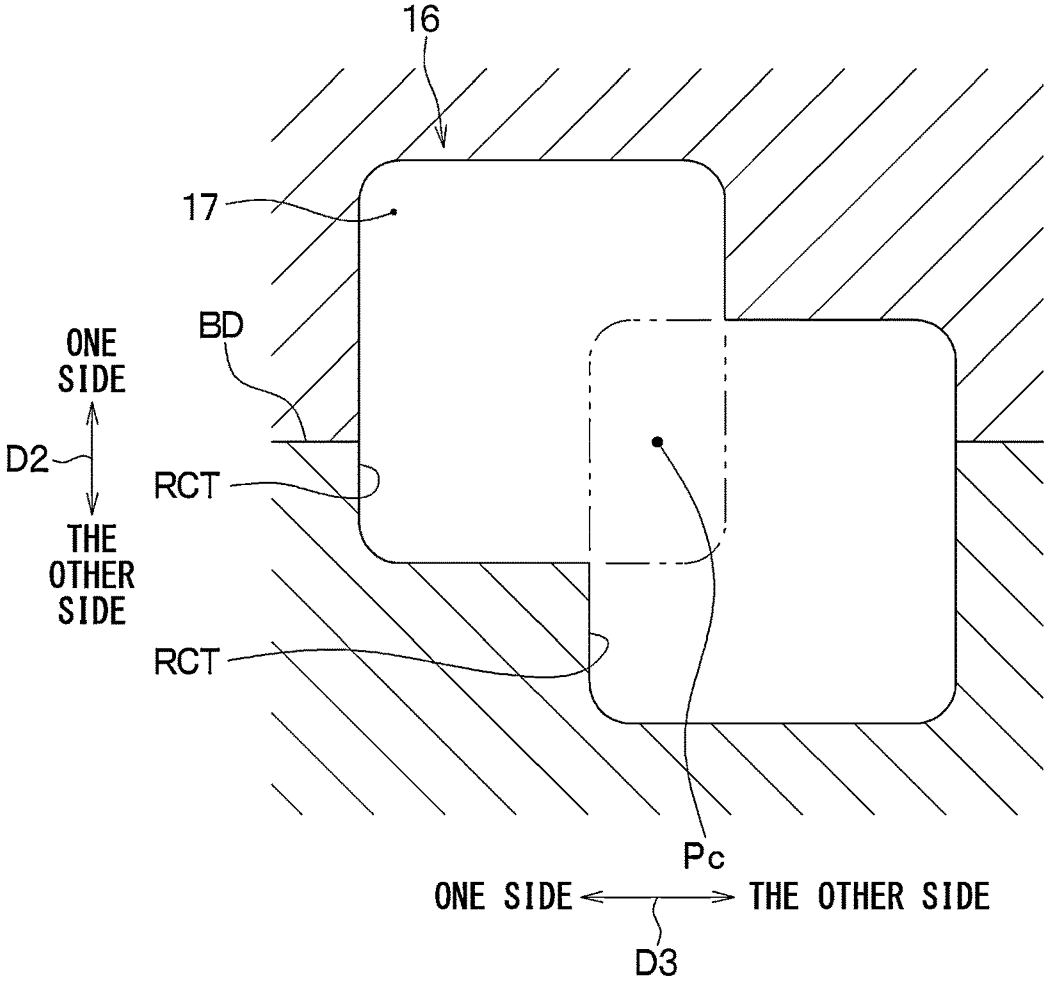
FIG. 8 is a cross-sectional view showing a polarization conversion unit extracted from FIG. 5.

Specifically, as shown in FIG. 8, as the contour shape of the conversion space 17 in the cross-section, a pair of rectangular shapes RCT are arranged offset from each other in the height direction D2 and the width direction D3 and are partially overlapping and connected to each other. That is, the contour shape of the conversion space 17 in the cross-section is a point-symmetric shape. The spatial shape of the conversion space 17 is set such that the cross-sectional contour shape of the conversion space 17 extends in the longitudinal direction D1.

As shown in FIG. 5, the edge 17*d* of the conversion space 17 in the height direction D2 coincides with the edge 13*d* of the first waveguide 13 in the height direction D2, and the edge 17*e* of the conversion space 17 in the height direction D2 coincides with the edge 13*e* of the first waveguide 13 in the height direction D2. Moreover, the edge 17*f* of the conversion space 17 in the width direction D3 coincides with the edge 21*d* of the second waveguide 21 in the width direction D3, and the edge 17*g* of the conversion space 17 in the width direction D3 coincides with the edges 21*e* of the second waveguide 21 in the width direction D3. Furthermore, when viewed in the longitudinal direction D1, the center of the other end 13*b* of the first waveguide 13, the center of the one end 21*a* of the second waveguide 21, and the center of the conversion space 17 are indicated by the point Pc in FIG. 5, coinciding with each other. The two-dot chain line in FIG. 8 is an imaginary line drawn to facilitate understanding of the rectangular shape RCT, and does not represent the actual outer shape.

Since the conversion space 17 has the spatial shape described above, the polarization conversion unit 16 propagates radio waves as follows when transmitting and receiving radio waves. For example, when transmitting radio waves, the polarization conversion unit 16 propagates the radio waves from the first waveguide 13 into the conversion space 17, and changes the electric field oscillation direction De of the radio waves from the width direction D3 to a direction along the height direction D2 so as to send the radio waves from the conversion space 17 to the second waveguide 21. In addition, when receiving radio waves, the polarization conversion unit 16 propagates the radio waves from the second waveguide 21 into the conversion space 17, and changes the electric field oscillation direction De of the radio waves from the height direction D2 to a direction along the width direction D3 so as to send the radio waves from the conversion space 17 to the first waveguide 13.

As shown in FIGS. 1 to 3, in addition to the second waveguide 21, the second waveguide section 20 has plural antenna apertures 24 to form the antenna radiating element, and plural open spaces 26. In this embodiment, five antenna apertures 24 and five open spaces 26 are formed. The antenna apertures 24 are arranged side by side in the longitudinal direction D1, and the open spaces 26 are arranged side by side in the longitudinal direction D1.

In this embodiment, the five antenna apertures 24 are referred to as the first antenna aperture 241, the second antenna aperture 242, the third antenna aperture 243, the fourth antenna aperture 244, and the fifth antenna aperture 245, in order from one side in the longitudinal direction D1. The first to fifth antenna apertures 241, 242, 243, 244, 245 may be collectively and simply referred to as antenna aperture 24 or antenna apertures 241 to 245.

The five open spaces 26 are referred to as the first open space 261, the second open space 262, the third open space 263, the fourth open space 264, and the fifth open space 265, in order from one side in the longitudinal direction D1. The first to fifth open spaces 261, 262, 263, 264, 265 may be collectively and simply referred to as open space 26 or open spaces 261 to 265.

Each of the antenna apertures 24 allows radio waves to propagate between the second waveguide 21 and the external space SP of the antenna device 1 through the antenna aperture 24. Specifically, each of the antenna apertures 24 is provided on one side of the second waveguide 21 in the height direction D2, and is connected to the second waveguide 21 from one side in the height direction D2. Each of the antenna apertures 24 is formed as a through hole penetrating the second waveguide section 20 from the second waveguide 21 to one side in the height direction D2.

Further, each of the open spaces 26 is provided on one side of the antenna apertures 24 in the height direction D2. The open space 26 is open to the external space SP of the antenna device 1 on one side in the height direction D2, and is connected to the antenna aperture 24 on the other side in the height direction D2. Therefore, each of the antenna apertures 24 faces one side in the height direction D2 and is open to the external space SP. The second waveguide 21 communicates with the external space SP via the antenna aperture 24 and the open space 26 in this order. This allows radio waves to propagate between the second waveguide 21 and the external space SP via each combination of the antenna aperture 24 and the open space 26. The plural combinations of the antenna aperture 24 and the open space 26 are formed in parallel between the second waveguide 21 and the external space SP.

Further, the antenna aperture 24 has an elliptical shape extending in the longitudinal direction D1 in a plan view. The second waveguide section 20 has an aperture peripheral surface 25 which is a wall surface of the antenna aperture 24 formed as a through hole, for each of the antenna apertures 24. The aperture peripheral surface 25 is formed in an annular shape so as to surround the antenna aperture 24 in a plan view, and faces and contacts the antenna aperture 24.

Figure 9:
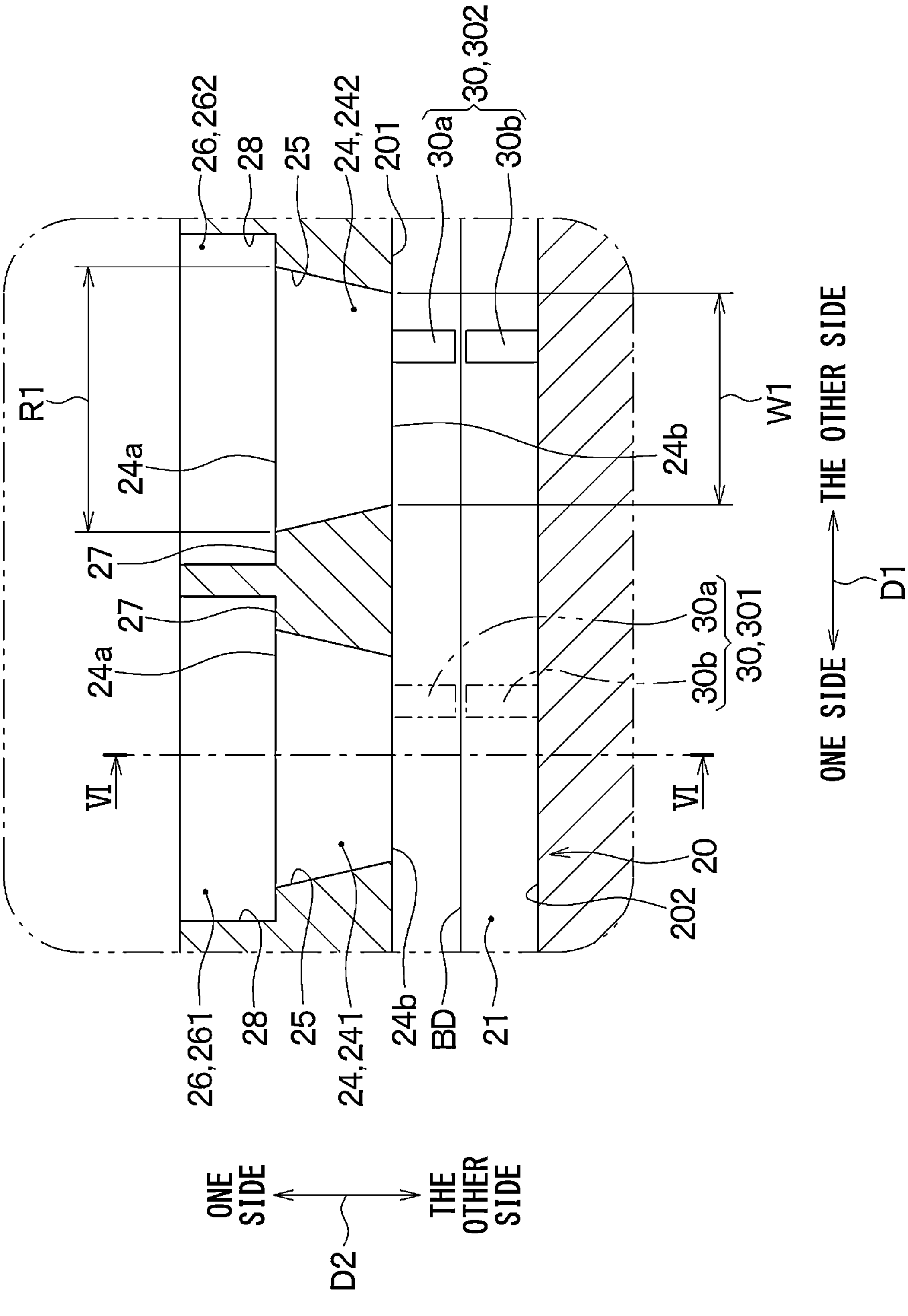
FIG. 9 is an enlarged view of a portion IX in FIG. 1 in the first embodiment.

As shown in FIGS. 1, 6 and 9, each of the antenna apertures 24 is formed in a tapered shape as a hole that widens toward one side in the height direction D2. That is, the aperture peripheral surface 25 surrounding the antenna aperture 24 is inclined with respect to the height direction D2 so that the antenna aperture 24 widens toward one side in the height direction D2. In this embodiment, the aperture peripheral surface 25 is an inclined surface that extends linearly and is inclined with respect to the height direction D2 in both the cross-section perpendicular to the longitudinal direction D1 and the cross-section perpendicular to the width direction D3.

For example, as shown in FIG. 9, the other end 24*b* of the antenna aperture 24 on the other side of the height direction D2 has the dimension W1 in the longitudinal direction D1, which is approximately 0.4 to 0.8 times the wavelength of the radio wave at the operating frequency. The wavelength of radio waves at the operating frequency is a wavelength of radio waves at a representative frequency included in the operating frequency, and can be interpreted as, for example, a wavelength of radio waves at the center frequency of the operating frequency. The line VI-VI in FIG. 9 indicates the cross-sectional position in FIG. 6.

The antenna apertures 24 are arranged in the longitudinal direction D1. More specifically, the antenna apertures 24 are arranged, as shown in FIGS. 2 and 3, in order to align the phases of the radio waves at the antenna apertures 24. That is, the antenna apertures 24 are arranged in the longitudinal direction D1 while being alternately biased to one side and the other side in the width direction D3 with respect to the central axis Cb of the second waveguide 21. The central axis Cb of the second waveguide 21 is a center line obtained by connecting the centers of the second waveguide 21 in the cross-section in the longitudinal direction D1, and is a straight line extending in the longitudinal direction D1.

Specifically, as shown in FIGS. 1 to 3, the first antenna aperture 241, the third antenna aperture 243, and the fifth antenna aperture 245 are arranged offset to one side in the width direction D3 with respect to the central axis Cb of the second waveguide 21. The second antenna aperture 242 and the fourth antenna aperture 244 are disposed offset toward the other side in the width direction D3 with respect to the central axis Cb of the second waveguide 21.

The pitch PT of the antenna apertures 24 in the longitudinal direction D1 is determined based on the guide wavelength λg of the radio waves propagating in the second waveguide 21. For example, the pitch PT of the antenna apertures 24 in the longitudinal direction D1 is set to "0.5×λg" or approximately "0.5×λg".

With such an arrangement of the antenna apertures 24, the antenna device 1 of this embodiment is configured so that the phases of radio waves are aligned at all of the antenna apertures 24.

As shown in FIGS. 6 and 9, the second waveguide section 20 has an open-space bottom surface 27 and an open-space side surface 28 that face and contact the open space 26, for each of the open spaces 26. That is, the second waveguide section 20 has the open-space bottom surfaces 27 and the open-space side surfaces 28, the number of which is the same as the number of the open spaces 26.

Each of the open-space bottom surfaces 27 is provided on the other side of the open space 26 in the height direction D2 and contacts the open space 26 from the other side in the height direction D2. In other words, each of the open-space bottom surfaces 27 faces one side in the height direction D2 and faces the open space 26. For example, each of the open-space bottom surfaces 27 is formed in a plane perpendicular to the height direction D2, and has a rectangular outer shape composed of two sides along the longitudinal direction D1 and two sides along the width direction D3.

Further, the antenna aperture 24 is formed for each of the open-space bottom surfaces 27. Therefore, the open-space bottom surface 27 is formed so that the open end 24*a* of the antenna aperture 24 on one side in the height direction D2 expands in the longitudinal direction D1 and the width direction D3.

Each of the open-space side surfaces 28 extends from the peripheral edge of the rectangular open-space bottom surface 27 to one side in the height direction D2. Each of the open-space side surfaces 28 is formed in an annular shape so as to surround the entire periphery of the open space 26, and is formed facing inward of the annular shape. Therefore, in a plan view, the open-space side surface 28 has a rectangular shape similar to the open-space bottom surface 27, and the open space 26 is formed inside the open-space side surface 28.

Due to this arrangement, in terms of the arrangement relationship with the antenna apertures 24, each of the open-space side surfaces 28 is provided on one side of the antenna apertures 24 in the height direction D2. The open-space side surfaces 28 surround the antenna aperture 24 in a plan view, to form an annular shape separated from the antenna apertures 24. The open-space side surface 28 corresponds to an aperture peripheral surface of the present disclosure.

As shown in FIG. 3, the second waveguide section 20 has plural reflection suppressing walls 30 provided within the second waveguide 21. The reflection suppressing wall 30 suppresses the reflection of radio waves in the second waveguide 21 compared with a configuration in which the reflection suppressing walls 30 are not provided. In short, the reflection suppressing walls 30 reduce the reflection of radio waves in the second waveguide 21. The reflection suppressing walls 30 are provided in the same number as the antenna apertures 24, that is, five in total. The reflection suppressing wall 30 corresponds to an intraductal protrusion of the present disclosure. In FIG. 3, the reflection suppressing wall 30 is hatched in dots in order to make the reflection suppressing wall 30 easier to understand.

In this embodiment, the five reflection suppressing walls 30 are referred to as a first reflection suppressing wall 301, a second reflection suppressing wall 302, a third reflection suppressing wall 303, a fourth reflection suppressing wall 304, and a fifth reflection suppressing wall 305, in order from one side in the longitudinal direction D1. When the first to fifth reflection suppressing walls 301, 302, 303, 304, 305 may be collectively and simply referred to as the reflection suppressing wall 30 or the reflection suppressing walls 301 to 305.

The first, third, and fifth reflection suppressing walls 301, 303, and 305 do not actually appear in the cross-section of the antenna device 1 of FIG. 1. However, in FIG. 1, the first, third, and fifth reflection suppressing walls 301, 303, and 305 are shown by imaginary dotted lines to show the arrangement of the reflection suppressing wall 30. Similarly, in FIG. 9, the first reflection suppressing wall 301 does not actually appear in the cross-section of the antenna device 1, but the first reflection suppressing wall 301 is shown by an imaginary two-dot chain line.

Specifically, the reflection suppressing walls 30 are disposed in correspondence with the antenna apertures 24 respectively. A certain reflection suppressing wall 30 included in the reflection suppressing walls 30 is arranged corresponding to a certain antenna aperture 24 included in the antenna apertures 24. In other words, as shown in FIG. 1, among the antenna apertures 24, a certain antenna aperture 24 is arranged closest to a certain reflection suppressing wall 30 when viewed in a direction along the width direction D3.

Specifically, as shown in FIGS. 1 to 3, the first reflection suppressing wall 301 is arranged to correspond to the first antenna aperture 241, and the second reflection suppressing wall 302 is arranged to correspond to the second antenna aperture 242. The third reflection suppressing wall 303 is arranged to correspond to the third antenna aperture 243, and the fourth reflection suppressing wall 304 is arranged to correspond to the fourth antenna aperture 244. The fifth reflection suppressing wall 305 is arranged to correspond to the fifth antenna aperture 245. For example, taking the first reflection suppressing wall 301 and the first antenna aperture 241 as an example, as shown in FIG. 1, when viewed in a direction along the width direction D3, among the antenna apertures 24, the first antenna aperture 241 is positioned closest to the first reflection suppressing wall 301.

As shown in FIGS. 3 and 6, each of the first reflection suppressing wall 301, the third reflection suppressing wall 303 and the fifth reflection suppressing wall 305 is formed in the shape of a rib protruding from the fourth side wall surface 204 to one side in the width direction D3 and extending in the height direction D2. Each of the second reflection suppressing wall 302 and the fourth reflection suppressing wall 304 is formed in the shape of a rib protruding from the third side wall surface 203 to the other side in the width direction D3 and extending in the height direction D2.

In detail, the reflection suppressing walls 30 are arranged in the longitudinal direction D1 while being staggered to one side and the other side in the width direction D3 with respect to the central axis Cb of the second waveguide 21.

Each of the reflection suppressing walls 30 is arranged biased toward the opposite side of the corresponding antenna aperture 24, with respect to the central axis Cb of the second waveguide 21 in the width direction D3. This can be explained as follows by taking the first reflection suppressing wall 301 and the corresponding first antenna aperture 241 as an example. As shown in FIGS. 2 and 3, the first antenna aperture 241 is disposed offset to one side in the width direction D3 with respect to the central axis Cb of the second waveguide 21. The first reflection suppressing wall 301 is arranged biased toward the opposite side of the first antenna aperture 241, with respect to the central axis Cb of the second waveguide 21, (in other words, the other side in the width direction D3).

Furthermore, with regard to the arrangement of the reflection suppressing walls 30 in the longitudinal direction D1, the following can be said. That is, as shown in FIGS. 1 and 9, each of the reflection suppressing walls 30 is at least partially within a range R1 that the antenna aperture 24 corresponding to the reflection suppressing wall 30 occupies in the longitudinal direction D1. At the same time, each of the reflection suppressing walls 30 is disposed so as to be biased toward the other side in the longitudinal direction D1 with respect to the corresponding antenna aperture 24.

This can be explained as follows by taking the second reflection suppressing wall 302 and the corresponding second antenna aperture 242 as an example. In other words, the second reflection suppressing wall 302 at least partially overlaps with the range R1 occupied by the second antenna aperture 242 in the longitudinal direction D1. At the same time, the second reflection suppressing wall 302 is disposed offset toward the other side in longitudinal direction D1 with respect to the second antenna aperture 242.

The reflection suppressing wall 30 at least partially overlaps with the range R1 in the longitudinal direction D1. In other words, at least a part of the reflection suppressing wall 30 is within the range R1. In this embodiment, as shown in FIG. 9, the entirety of the second reflection suppressing wall 302 is within the above-mentioned range R1 of the second antenna aperture 242.

As shown in FIGS. 6 and 9, in this embodiment, the boundary BD between the first block BC1 and the second block BC2 is located at the middle of the range of the reflection suppressing wall 30 in the height direction D2. Therefore, each of the reflection suppressing walls 30 is composed of one side wall 30*a* provided on one side of the boundary BD between the first block BC1 and the second block BC2 in the height direction D2, and the other side wall 30*b* provided on the other side of the boundary BD between the first block BC1 and the second block BC2 in the height direction D2. The one side wall 30*a* and the other side wall 30*b* are aligned in a straight line in the height direction D2 but are spaced apart from each other, such that a small gap is formed between the one side wall 30*a* and the other side wall 30*b* in the height direction D2.

The shape and arrangement of the reflection suppressing wall 30 is determined by, for example, computer simulation so as to suppress the reflection of radio waves in the second waveguide 21.

In detail, each of the reflection suppressing walls 30 is formed and arranged so that the radio waves reflected within the second waveguide 21 due to the corresponding antenna aperture 24 are cancelled out by the radio waves reflected by the reflection suppressing wall 30. For example, the following can be said by taking the first reflection suppressing wall 301 and the corresponding first antenna aperture 241 as an example. The first reflection suppressing wall 301 is formed and positioned so that the radio waves reflected within the second waveguide 21 due to the first antenna aperture 241 are cancelled out by the radio waves reflected by the first reflection suppressing wall 301.

Next, the operation of the antenna device 1 will be described. As shown in FIGS. 1 to 4, in the antenna device 1 of this embodiment, when a radio wave is output from the input/output unit 3 of the MMIC 2, the radio wave is input to the external port 11. The radio wave input to the external port 11 travels from the external port 11 through the first waveguide 13 and the conversion space 17 in this order, and then reaches the second waveguide 21. Then, the radio wave that reaches the second waveguide 21 is propagated within the second waveguide 21, distributed to the five antenna apertures 24, and radiated from the five antenna apertures 24 through the open space 26 to the external space SP.

For example, when the input/output unit 3 of the MMIC 2 receives radio waves from the external space SP, the antenna device 1 propagates the radio waves in the opposite direction to the case where the radio waves are output from the input/output unit 3.

Here, the results of a computer simulation comparing the antenna device 1 of this embodiment with an antenna device 80 of a first comparative example to be compared with this embodiment will be described. In this computer simulation, radio waves of a particular wavelength are input from the conversion space 17 to the second waveguide 21.

Figure 10:
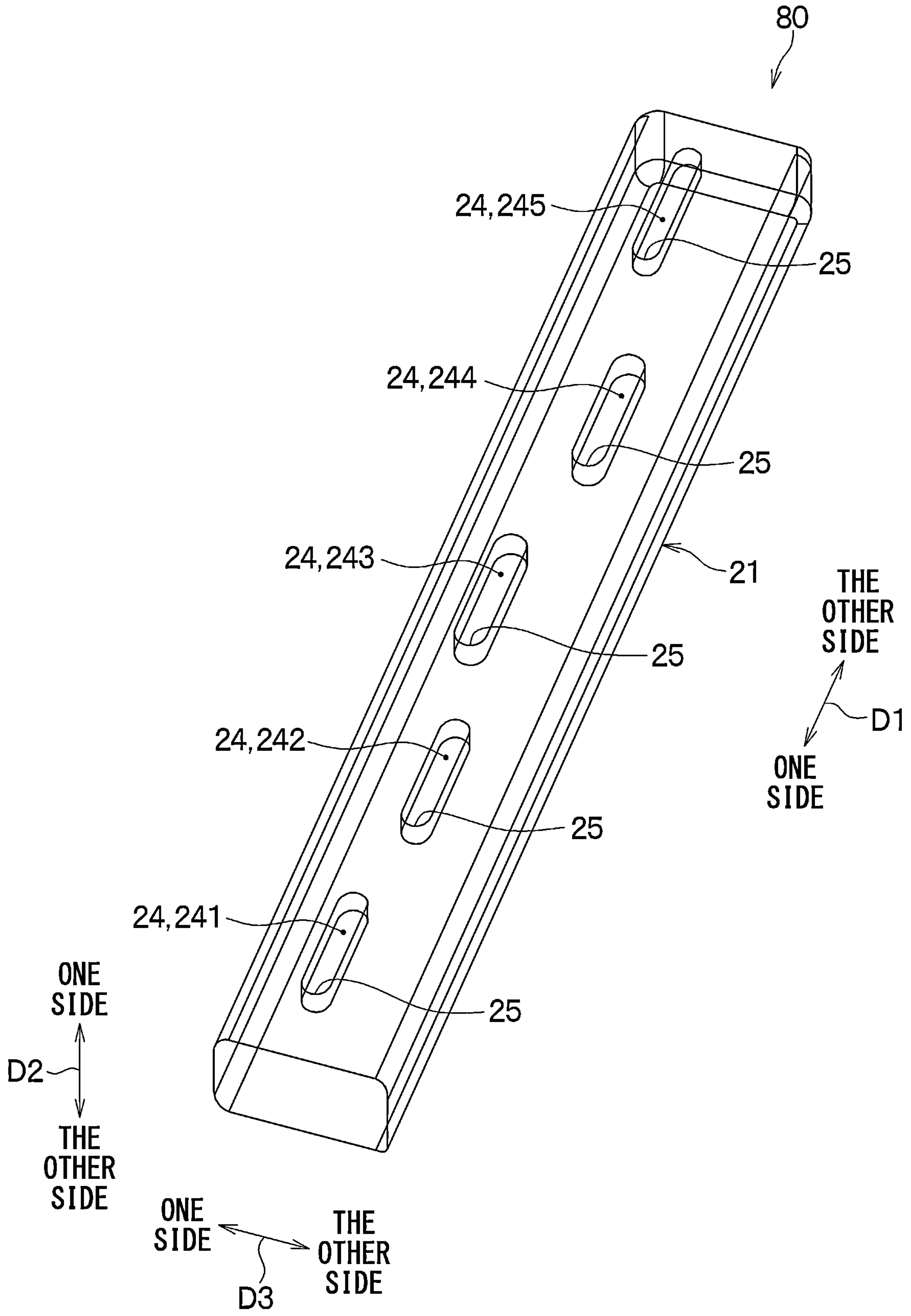
FIG. 10 is a perspective view showing, in wireframe form, a second waveguide and antenna apertures of an antenna device of a first comparative example to be compared with the first embodiment.

As shown in FIG. 10, in the antenna device 80 of the first comparative example, the aperture peripheral surface 25 of each antenna aperture 24 is not an inclined surface but a vertical surface parallel to the height direction D2, and no open space 26 (see FIG. 3) is formed. Furthermore, the antenna device 80 of the first comparative example is not provided with the reflection suppressing wall 30 (see FIG. 3). Except for these points, the antenna device 80 of the first comparative example is similar to the antenna device 1 of this embodiment.

Figure 11:
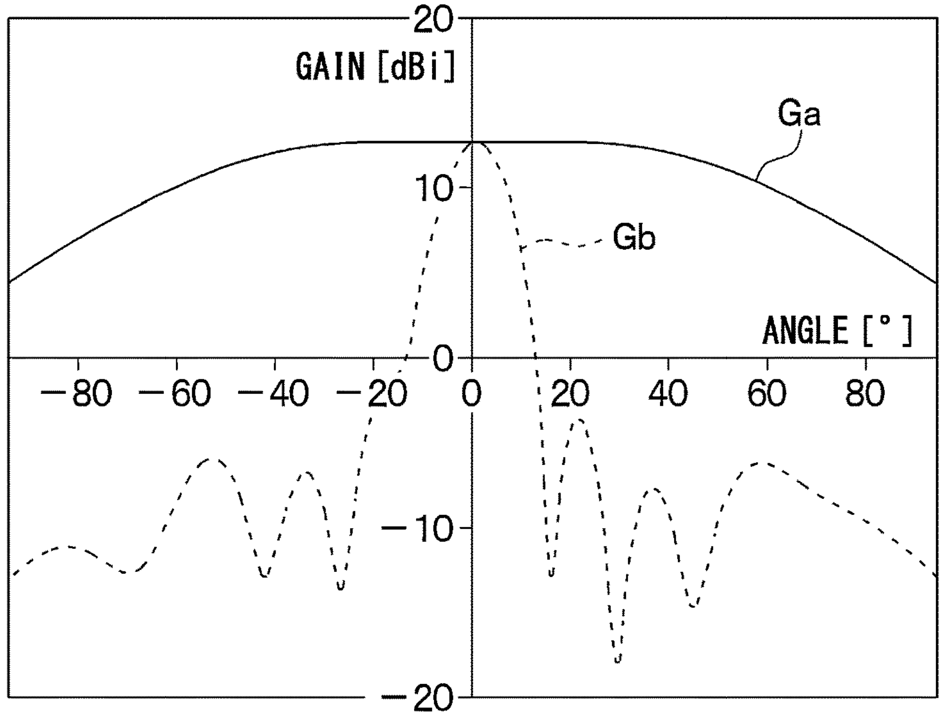
FIG. 11 is a diagram showing a gain distribution of the antenna device obtained by computer simulation in the first comparative example.
Figure 12:
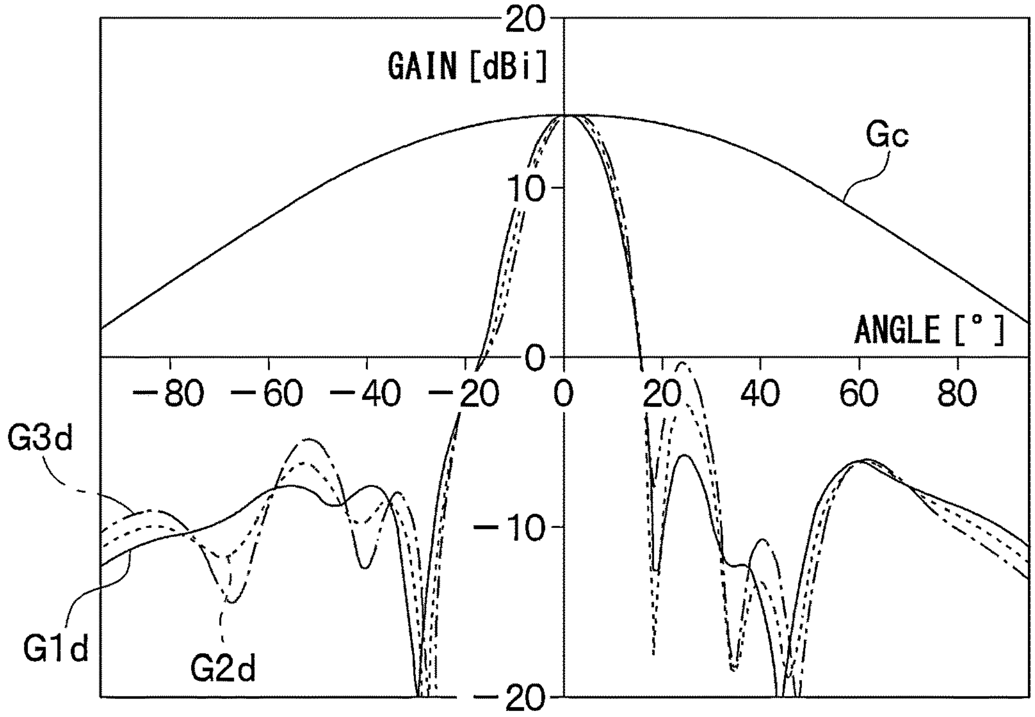
FIG. 12 is a diagram showing a gain distribution of the antenna device obtained by computer simulation in the first embodiment.
Figure 13:
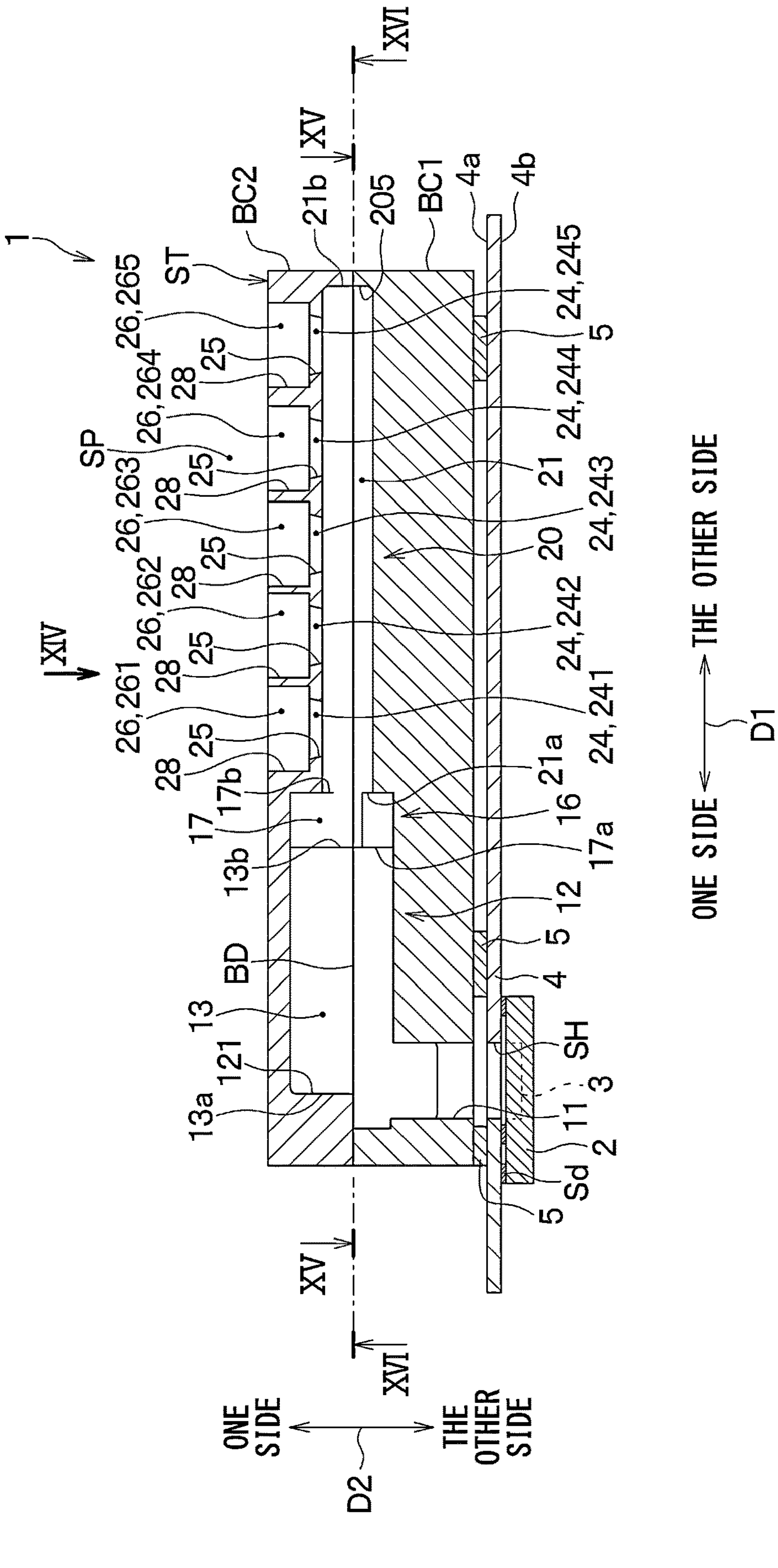
FIG. 13 is a schematic cross-sectional view showing an antenna device according to a second embodiment, corresponding to FIG. 1.
Figure 14:
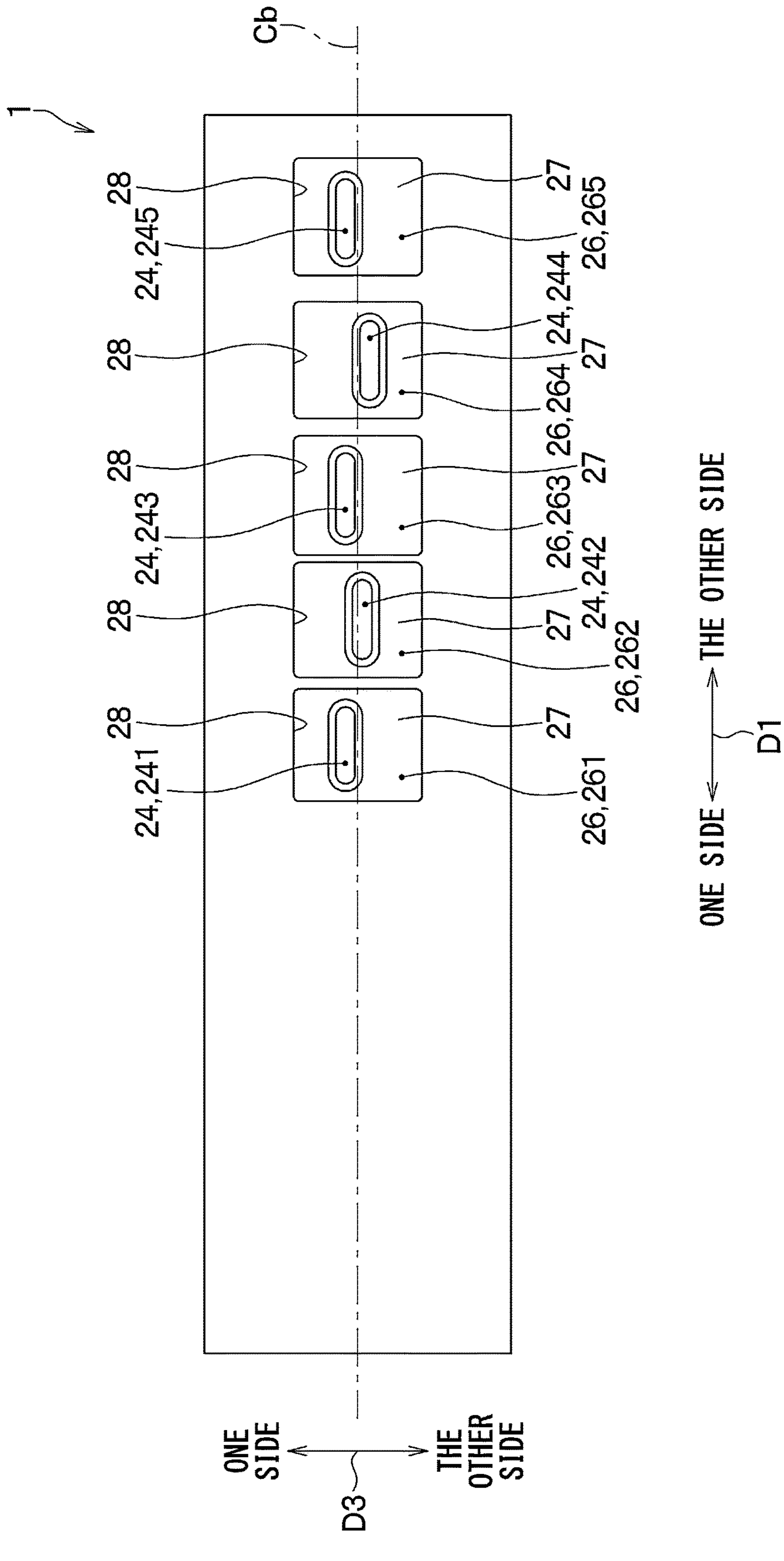
FIG. 14 is a schematic plan view showing the antenna device of the second embodiment seen in an arrow direction XIV in FIG. 13.
Figure 15:
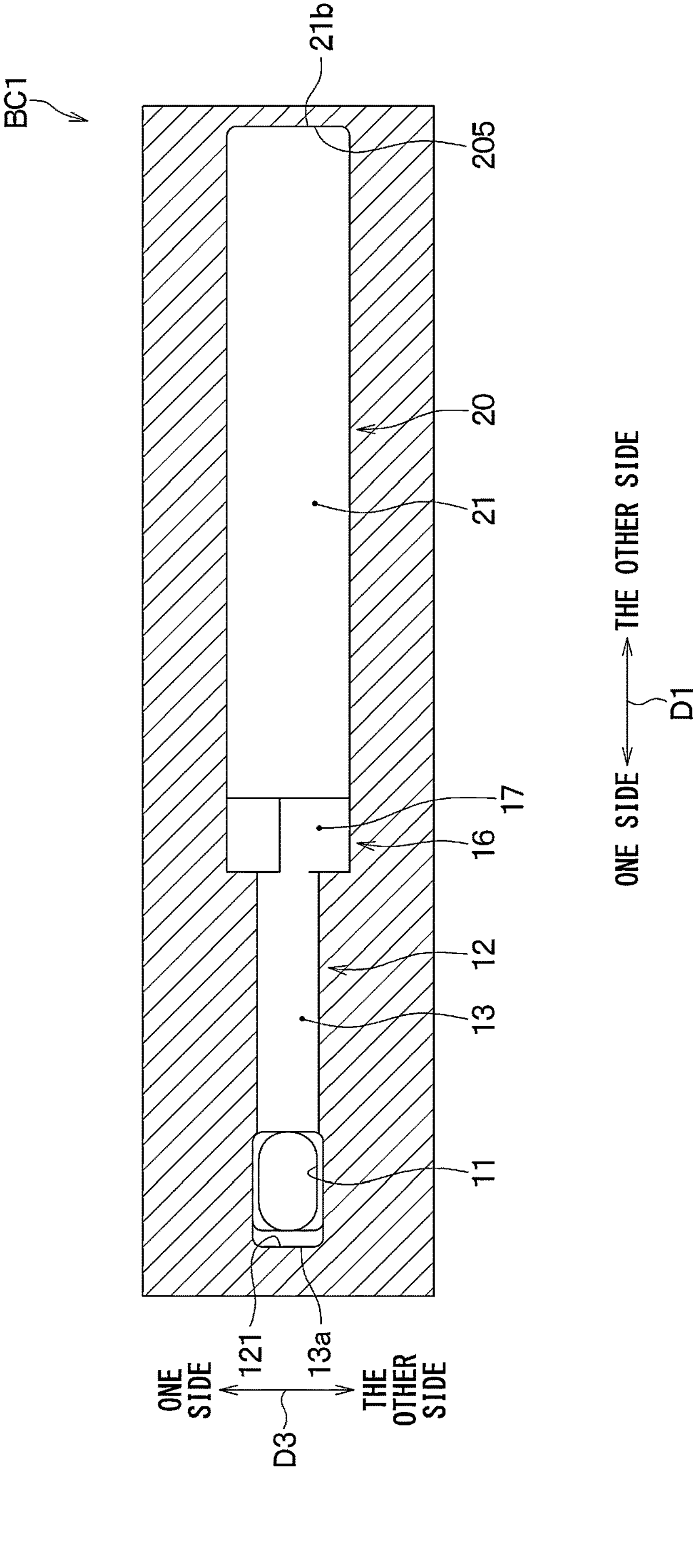
FIG. 15 is a schematic cross-sectional view taken along line XV-XV of FIG. 13, including a plan view of a first block in the antenna device of the second embodiment and corresponding to FIG. 4.
Figure 16:
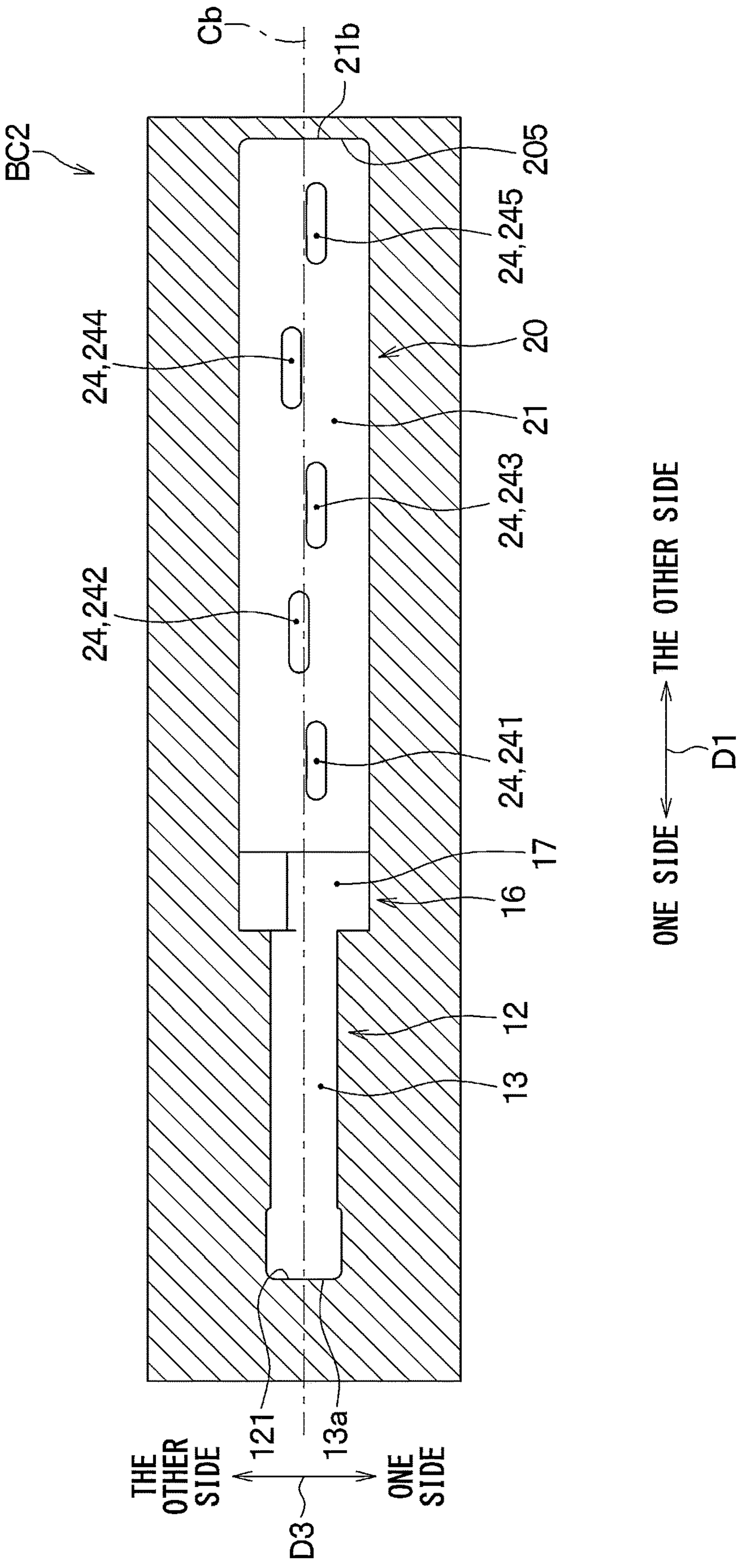
FIG. 16 is a schematic cross-sectional view taken along line XVI-XVI in FIG. 13, including a bottom view of a second block in the antenna device of the second embodiment.

The above computer simulation comparing this embodiment with the first comparative example yielded the results shown in FIGS. 11 and 12. FIG. 11 is a graph showing the gain distribution in the antenna device 80 of the first comparative example. FIG. 12 is a graph showing the gain distribution in the antenna device 1 of the present embodiment.

The curve Ga in FIG. 11 and the curve Gc in FIG. 12 represent the gain distribution on a plane perpendicular to the longitudinal direction D1. The curve Gb in FIG. 11 and the curves G1*d*, G2*d*, and G3*d* in FIG. 12 represent the gain distribution on a plane perpendicular to the width direction D3.

The curve G1*d* in FIG. 12 represents the gain distribution obtained when a radio wave having a wavelength of 76 GHz is input. The curves Ga and Gb in FIG. 11 and the curve G2*d* in FIG. 12 represent the gain distribution obtained when a radio wave having a wavelength of 76.5 GHz is input. Moreover, the curve G3*d* in FIG. 12 represents the gain distribution obtained when a radio wave having a wavelength of 77 GHz is input.

The curve Gc in FIG. 12 represents the gain distribution obtained when a radio wave having a wavelength of 76 GHz, 76.5 GHz, or 77 GHz is input. If the wavelength of the input radio wave differs, the gain distribution also differs. However, since the difference in the gain distribution is slight, the gain distribution is represented by the single curve Gc in FIG. 12.

As a result of the computer simulation, as can be seen from FIGS. 11 and 12, it was confirmed that the antenna device 1 of this embodiment had a gain improvement of 2.10 dBi compared to the antenna device 80 of the first comparative example when a radio wave with a wavelength of 76.5 GHz is input. Furthermore, it was confirmed that in the antenna device 1 of this embodiment, even when a radio wave having a wavelength of 76 GHz or 77 GHz is input, a gain can be obtained equivalent to that obtained when a radio wave having a wavelength of 76.5 GHz is input.

As described above, in this embodiment, as shown in FIGS. 1 to 3, the first waveguide 13 has a shape extended in the height direction D2 in a cross-section perpendicular to the longitudinal direction D1. The second waveguide 21 has a shape extended in the width direction D3 in the cross-section. The first waveguide 13 extends from the conversion space 17 of the polarization conversion unit 16 to one side in the longitudinal direction D1, and the second waveguide 21 extends from the conversion space 17 to the other side in the longitudinal direction D1. The plural antenna apertures 24 are connected to the second waveguide 21.

With this configuration, the first waveguide 13 is provided on one side of the antenna apertures 24 in the longitudinal direction D1. Therefore, the relative positional relationship of the first waveguide 13 with respect to the antenna apertures 24 is unlikely to cause the size of the antenna device 1 to increase in the width direction D3. Therefore, it is possible to suppress the size of the antenna device 1 from increasing in the width direction D3.

In this way, the increase in size of the antenna device 1 in the width direction D3 is suppressed. Therefore, for example, when multiple antenna devices 1 are provided, it is possible to densely arrange the antenna apertures 24 formed in each of the antenna devices 1 in the width direction D3.

Furthermore, since the antenna apertures 24 are connected to the second waveguide 21, it is easy to provide a large number of antenna apertures 24 according to the length of the second waveguide 21 in the longitudinal direction D1 without increase in size of the antenna device 1 in the width direction D3.

Moreover, according to the cross-sectional shapes of the first waveguide 13 and the second waveguide 21, the first waveguide 13 is advantageous for arranging the propagation path of the radio waves and for miniaturizing the antenna device 1. The second waveguide 21 to which the antenna apertures 24 are connected is advantageous in improving the gain and reducing the size of the antenna device 1. The first waveguide 13 and the second waveguide 21 can be used in appropriate locations. As a result, it is possible to achieve both miniaturization of the antenna device 1 and improvement of the gain.

(1) According to this embodiment, as shown in FIG. 6, each of the antenna apertures 24 is formed as a hole that widens toward one side in the height direction D2. This allows radio waves to be concentrated at each of the antenna apertures 24, making it possible to improve the gain of the antenna device 1.

In addition, a computer simulation was performed to compare this embodiment with a second comparative example which differs from this embodiment only in that the aperture peripheral surface 25 of each antenna aperture 24 is not an inclined surface but a vertical surface parallel to the height direction D2. As a result of the computer simulation, it was confirmed that the gain of the antenna device 1 in this embodiment was higher than that of the second comparative example.

(2) According to this embodiment, the open-space side surfaces 28 are provided on one side of the antenna aperture 24 in the height direction D2. The open-space side surfaces 28 surround the antenna aperture 24, in a plan view, to form an annular shape, and are formed facing inward of the annular shape. This allows radio waves to be concentrated in each of the open spaces 26 formed inside the open-space side surfaces 28, making it possible to improve the gain of the antenna device 1.

A computer simulation was conducted to compare this embodiment with a third comparative example, which differs from this embodiment only in that the open space 26, the open-space bottom surface 27, and the open-space side surface 28 are not formed such that the antenna aperture 24 is directly open to the external space SP. As a result of the computer simulation, it was confirmed that the gain of the antenna device 1 in this embodiment was higher than that of the third comparative example.

(3) According to this embodiment, as shown in FIGS. 1 to 4, the second waveguide 21 includes the reflection suppressing walls 30 to suppress reflection of radio waves in the second waveguide 21. The reflection suppressing wall 30 is disposed in correspondence with at least one of the antenna apertures 24. In this embodiment, the reflection suppressing wall 30 is arranged corresponding to each of the antenna apertures 24.

Therefore, compared to a case where the reflection suppressing wall 30 is not provided, it is possible to improve the amount of radio waves propagating to the second waveguide 21. Furthermore, the arrangement and shape of the reflection suppressing walls 30 can be determined individually in accordance with the reflection of radio waves caused by each of the antenna apertures 24. This provides the advantage that reflection of radio waves at the second waveguide 21 can be easily suppressed.

(4) According to this embodiment, as shown in FIGS. 1 to 3, the antenna apertures 24 are arranged in the longitudinal direction D1 while being biased alternately to one side and the other side in the width direction D3 with respect to the central axis Cb of the second waveguide 21. The reflection suppressing walls 30 are arranged in the second waveguide 21 in the longitudinal direction D1 while being staggered alternately to one side and the other side in the width direction D3 with respect to the central axis Cb of the second waveguide 21. However, each of the reflection suppressing walls 30 is arranged biased toward the opposite side of the corresponding antenna aperture 24 with respect to the central axis Cb of the second waveguide 21 in the width direction D3.

Therefore, compared to a case where multiple reflection suppressing walls 30 are arranged on the opposite side, in the width direction D3, to those shown in FIG. 2, the amount of protrusion of the reflection suppressing wall 30 from the third side wall surface 203 or the fourth side wall surface 204 is less likely to be restricted by the arrangement of the antenna apertures 24. Therefore, it is possible to improve the degree of freedom in determining the shapes of the reflection suppressing walls 30.

(5) According to this embodiment, as shown in FIGS. 1, 2 and 9, each of the reflection suppressing walls 30 is located at least partially within the range R1 occupied by the antenna aperture 24 to which the reflection suppressing wall 30 corresponds in the longitudinal direction D1. At the same time, each of the reflection suppressing walls 30 is disposed so as to be biased toward the other side in the longitudinal direction D1 with respect to the corresponding antenna aperture 24.

Therefore, each of the reflection suppressing walls 30 can be appropriately arranged so that the radio waves reflected within the second waveguide 21 due to the corresponding antenna aperture 24 can be canceled out by the radio waves reflected by the reflection suppressing wall 30.

Second Embodiment

A second embodiment of the present disclosure is described next. This embodiment is explained mainly with respect to points different from the first embodiment. In addition, explanations of the same or equivalent portions as those in the above embodiment is omitted or simplified. The same applies to a description of the embodiments described later.

As shown in FIGS. 13 to 19, in this embodiment, the antenna device 1 does not include the reflection suppressing wall 30 (see FIG. 3). Except for this point, this embodiment is similar to the first embodiment. Thus, this embodiment can achieve the advantages obtained by the configuration common to the first embodiment in a similar manner as in the first embodiment.

Figure 17:
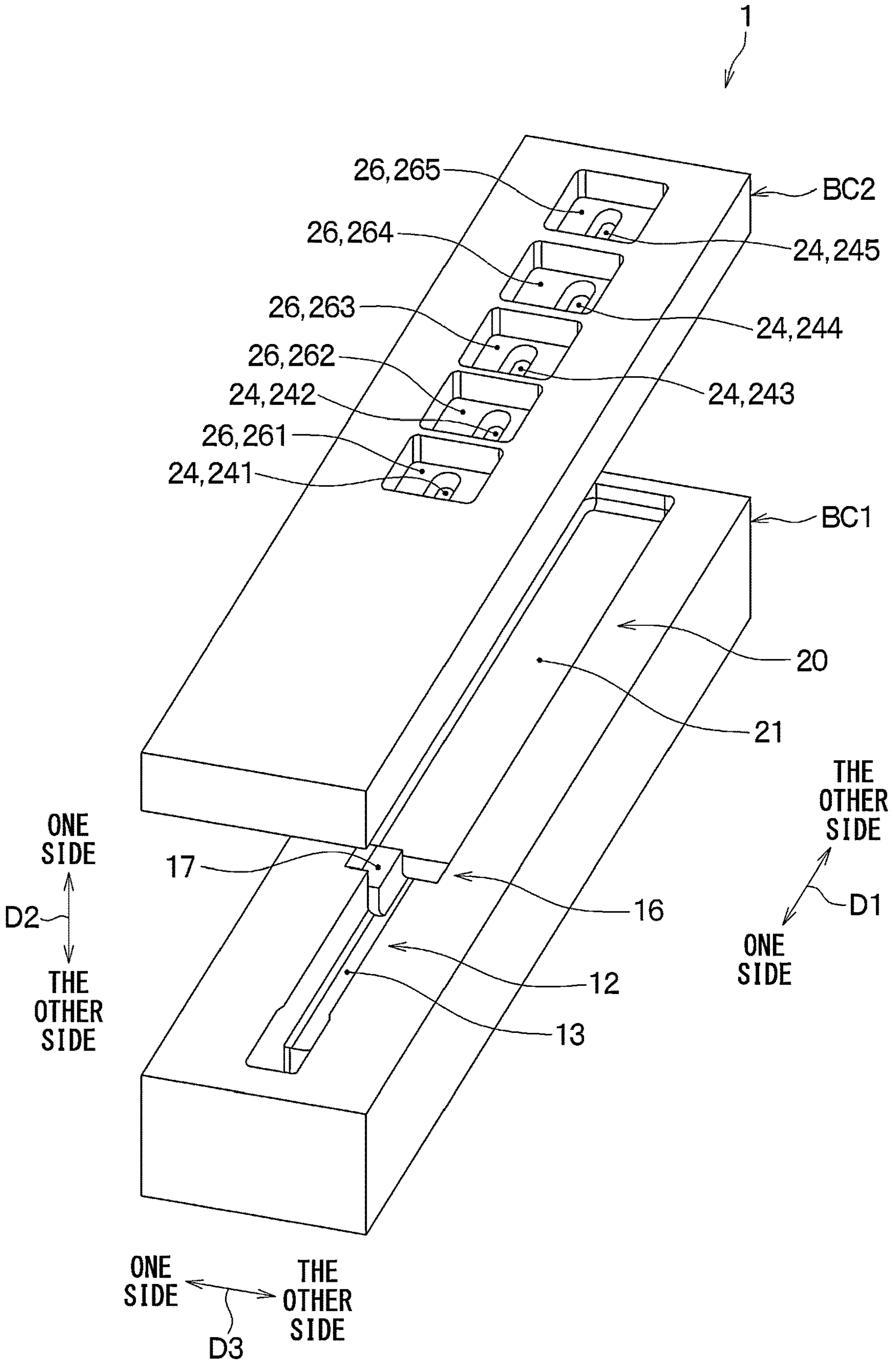
FIG. 17 is an exploded perspective view showing the first block and the second block of the antenna device of the second embodiment.
Figure 18:
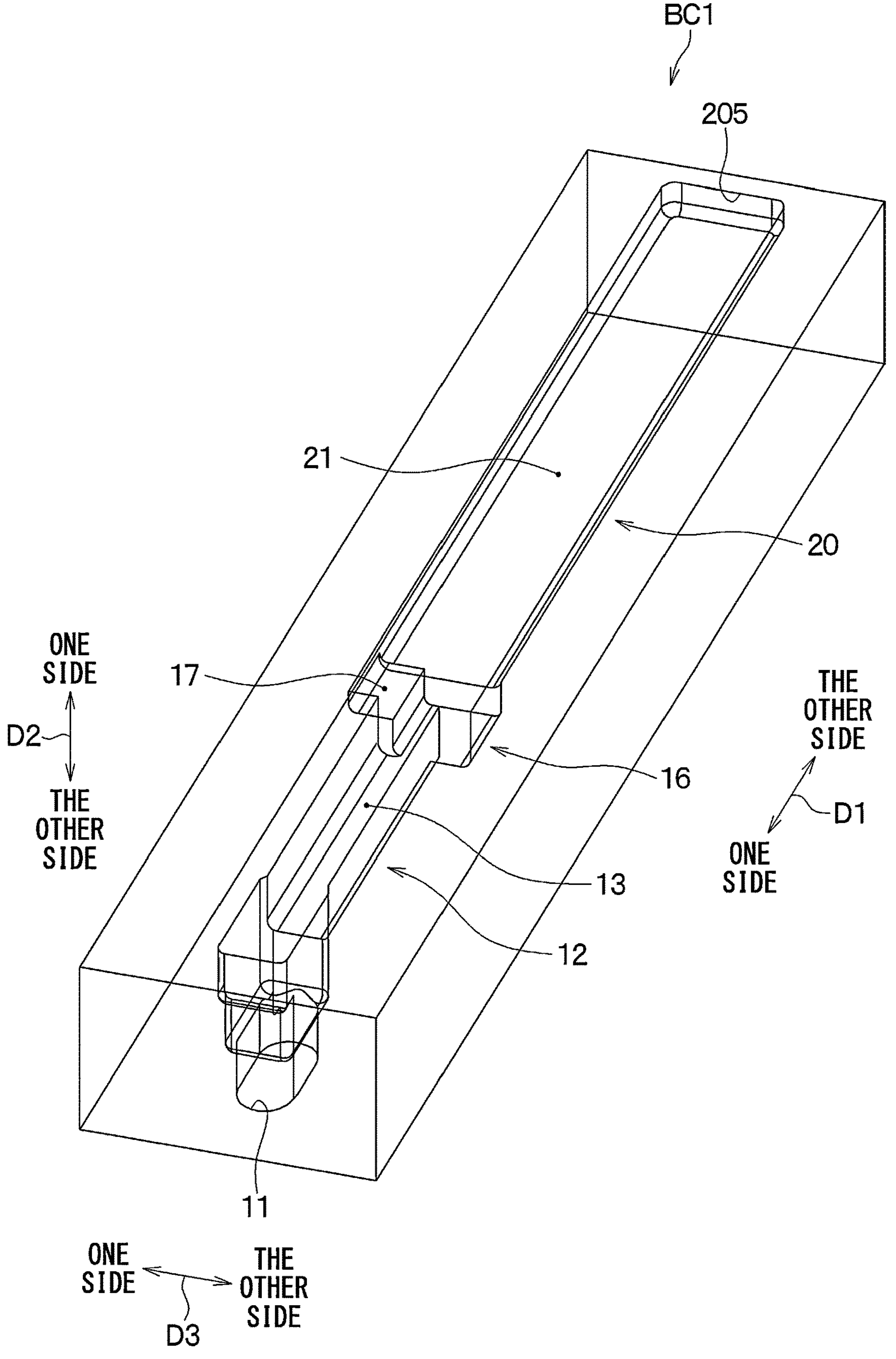
FIG. 18 is a perspective view showing the first block alone of the antenna device according to the second embodiment in wire frame.
Figure 19:
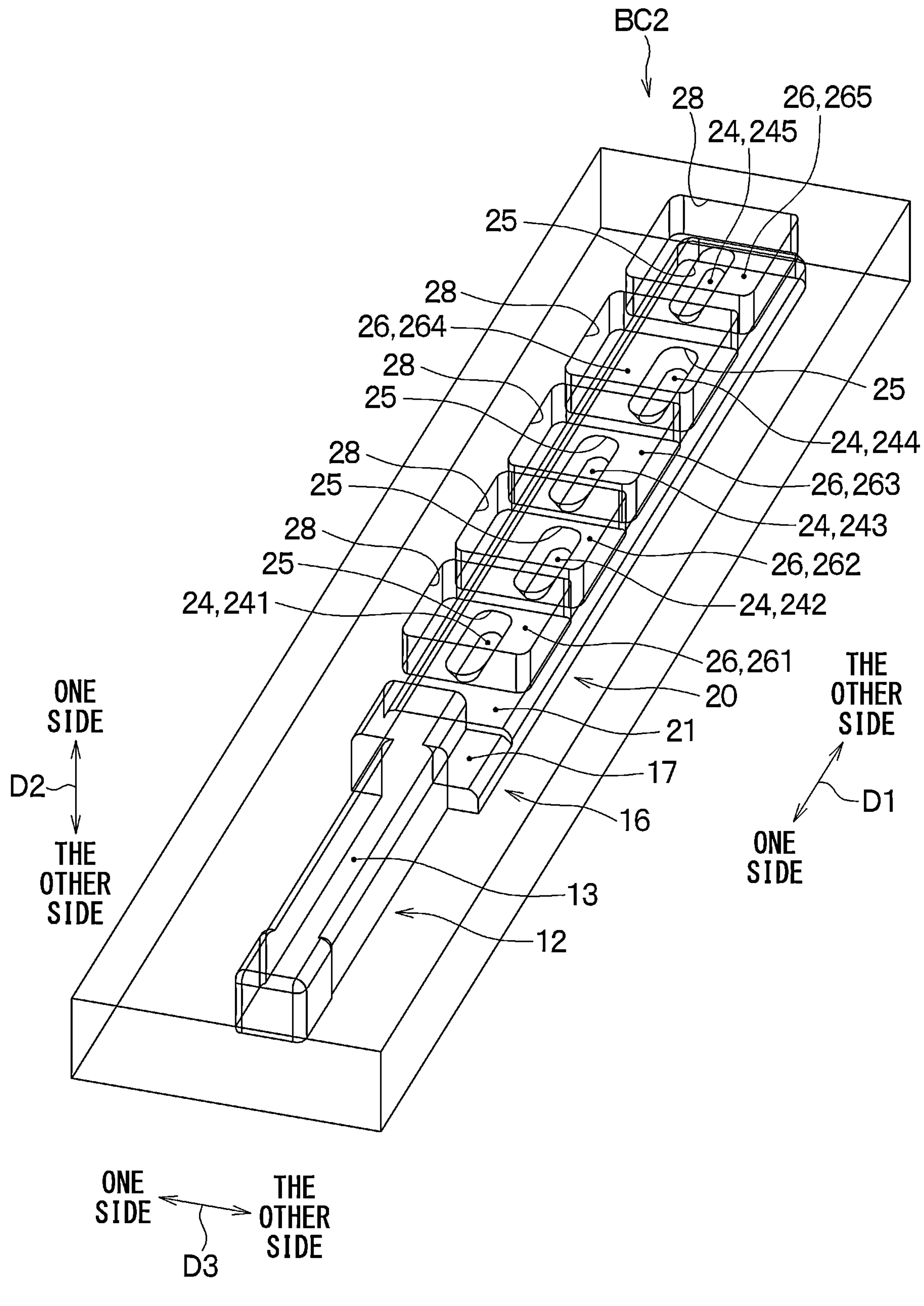
FIG. 19 is a perspective view showing the second block alone of the antenna device according to the second embodiment in wire frame.

FIG. 17 is an exploded perspective view showing the antenna device 1 of this embodiment disassembled into a first block BC1 and a second block BC2. FIG. 18 is a perspective view showing the first block BC1 in a wire frame, and FIG. 19 is a perspective view showing the second block BC2 in a wire frame.

Third Embodiment

A third embodiment is described next. The present embodiment will be explained with respect to portions different from the second embodiment.

As shown in FIGS. 20 to 23, in this embodiment, the open space 26 is different from that in the second embodiment. In this embodiment, one open space 26 is formed instead of plural open spaces 26. In this embodiment, the multiple open-space side surfaces 28 (see FIG. 19) of the second embodiment are replaced with an open-space side surface 29. The open-space side surface 29 corresponds to an aperture peripheral surface of the present disclosure.

Specifically, the open space 26 in this embodiment is provided on one side of the multiple antenna apertures 24 in the height direction D2, and extends so as to overlap all the multiple antenna apertures 24 in the height direction D2. For example, in a plan view, the open space 26 has a rectangular shape extending in the longitudinal direction D1, and all of the multiple antenna apertures 24 are located inside the rectangular shape.

In this embodiment, since the open space 26 is formed in this manner, the open-space bottom surface 27 and the open-space side surface 29 in this embodiment are provided one each. Plural antenna apertures 24 are formed in the open-space bottom surface 27.

In this embodiment, the open-space side surface 29 extends from the peripheral edge of the rectangular open-space bottom surface 27 to one side in the height direction D2. The open-space side surface 29 is formed in an annular shape so as to surround the entire periphery of the open space 26 and faces inward of the annular shape. Therefore, in a plan view, the open space 26 is formed inside the open-space side surface 29 which is formed in an annular shape.

Due to this arrangement, in terms of the arrangement relationship with the antenna apertures 24, the open-space side surface 29 is provided on one side of the multiple antenna apertures 24 in the height direction D2, similar to the open-space side surface 28 in the second embodiment. The open-space side surface 29 surrounds all of the antenna apertures 24 in a plan view, and is separated from the antenna apertures 24 to form an annular shape.

The open-space side surface 29 includes a pair of long side surfaces 291 and a pair of short side surfaces 292. The pair of long side surfaces 291 extend along the longitudinal direction D1 and are disposed opposite each other in the width direction D3 with the open space 26 therebetween. In contrast, the pair of short side surfaces 292 extend along the width direction D3 and are disposed opposite each other in the longitudinal direction D1 with the open space 26 therebetween. Therefore, the pair of long side surfaces 291 form the long sides of the rectangular shape of the open-space side surface 29 in a plan view, and the pair of short side surfaces 292 form the short sides of the rectangular shape.

The pair of long side surfaces 291 are formed in a flat shape along the height direction D2. In contrast, each of the short side surfaces 292 has a concave curved surface. In detail, the short side surface 292 is concavely curved in a cross-section perpendicular to the width direction D3, and formed so that the distance between the short side surfaces 292 in the longitudinal direction D1 becomes wider toward one side in the height direction D2. Therefore, the short side surface 292 is inclined with respect to the height direction D2, and the open space 26 is formed so as to expand toward one side in the height direction D2.

Figure 20:
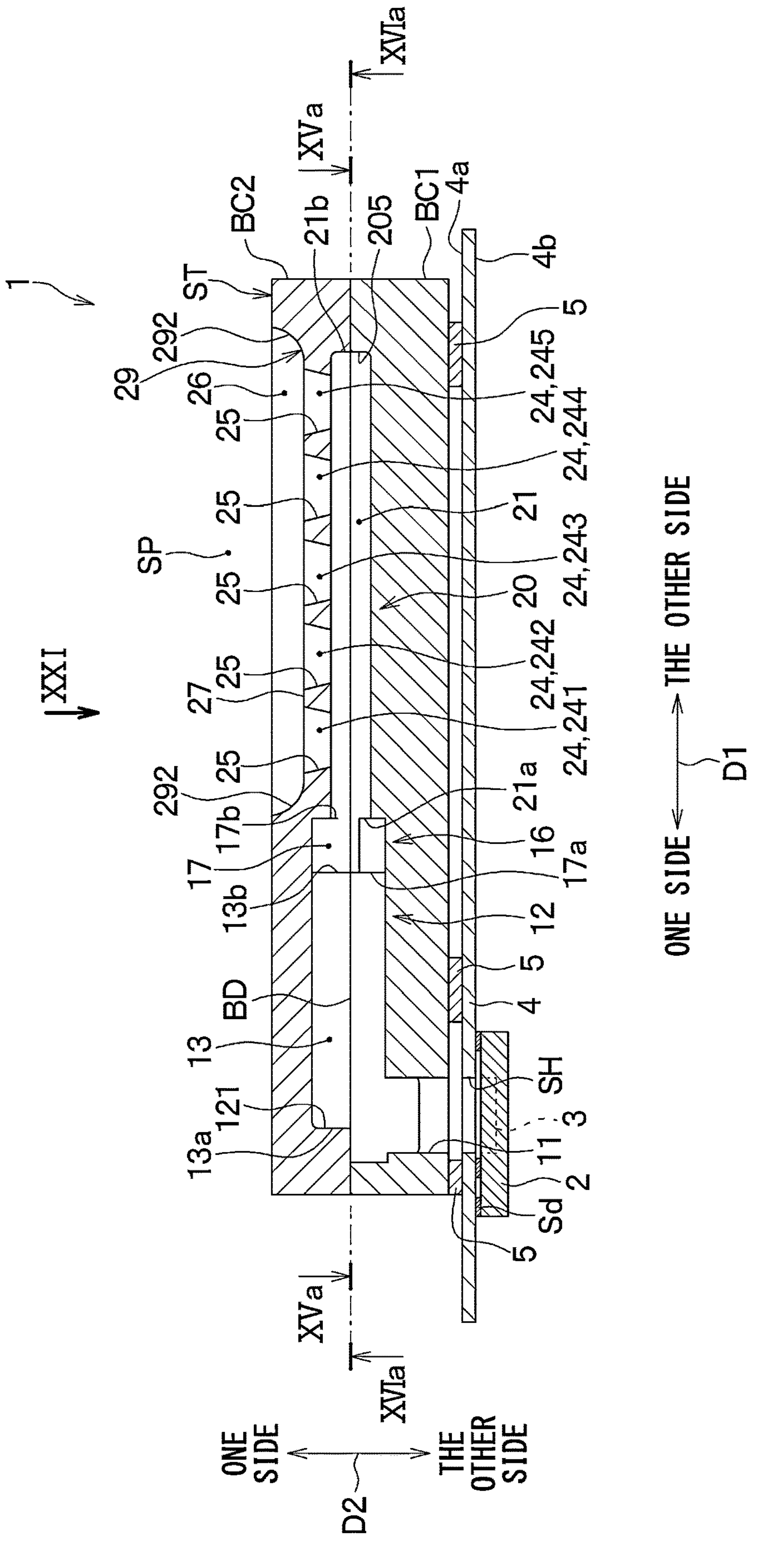
FIG. 20 is a schematic cross-sectional view showing an antenna device according to a third embodiment, corresponding to FIG. 1.
Figure 21:
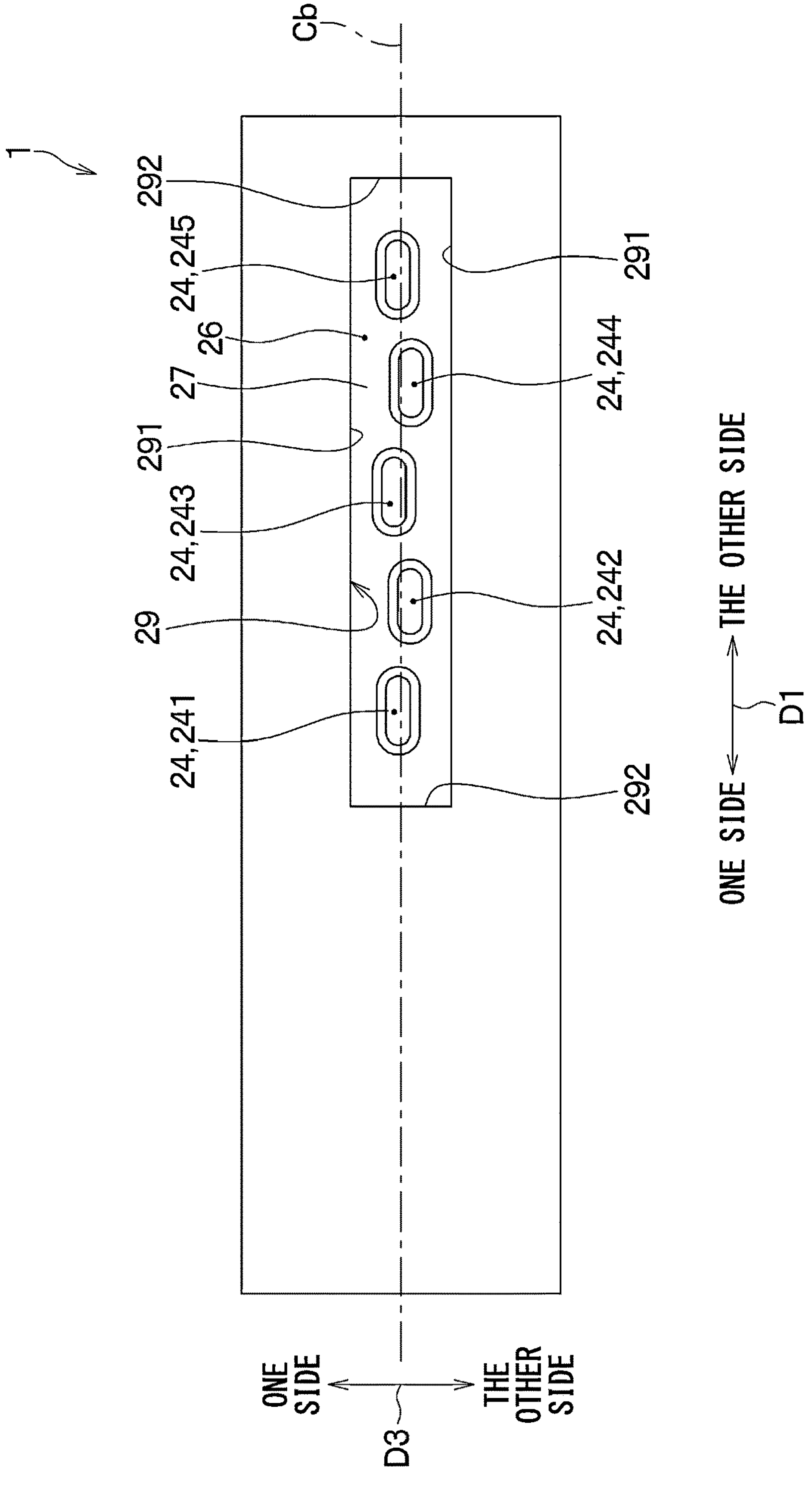
FIG. 21 is a plan view illustrating the antenna device of the third embodiment seen in an arrow direction XXI in FIG. 20.
Figure 22:
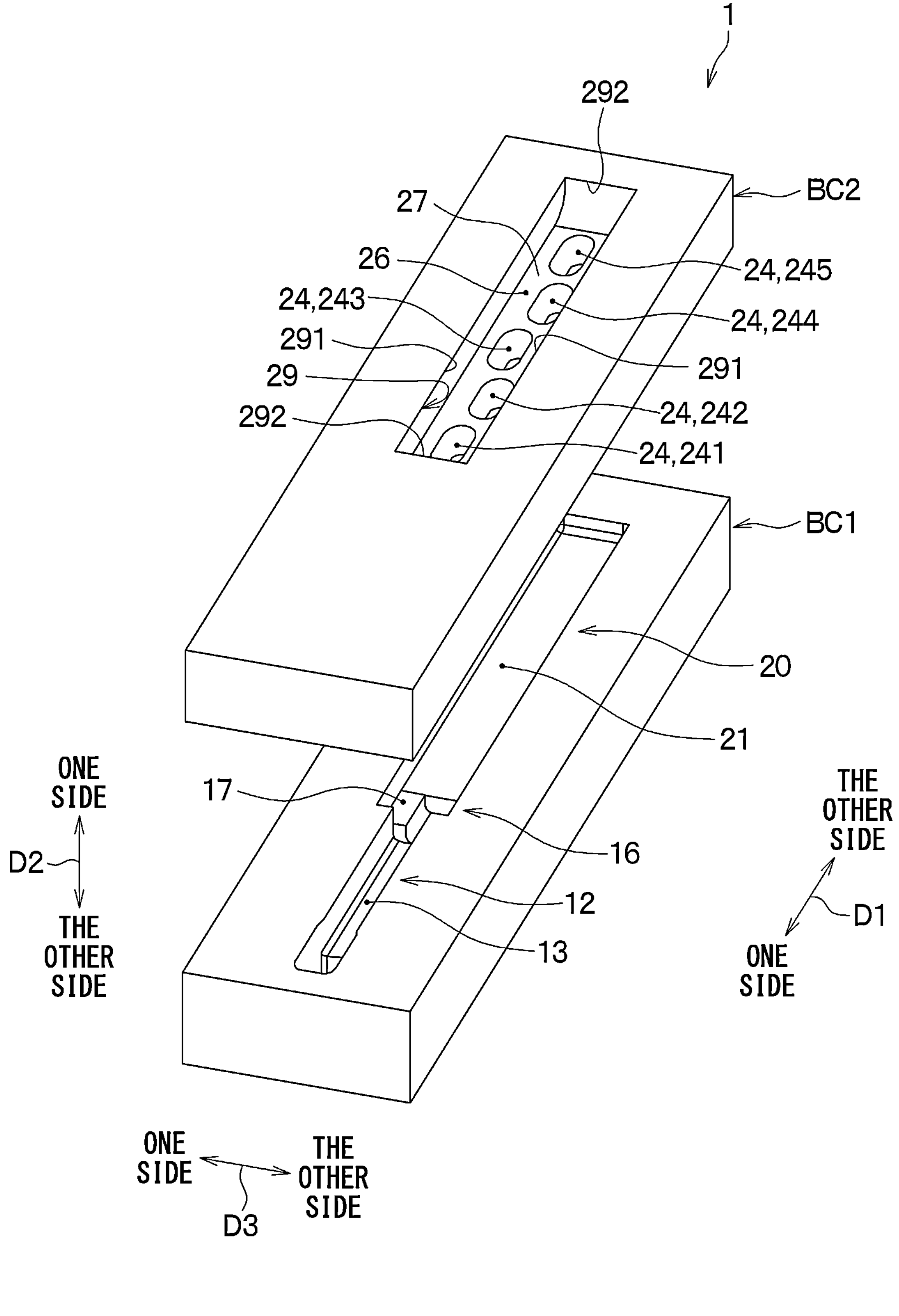
FIG. 22 is an exploded perspective view showing a first block and a second block of the antenna device of the third embodiment, corresponding to FIG. 17.
Figure 23:
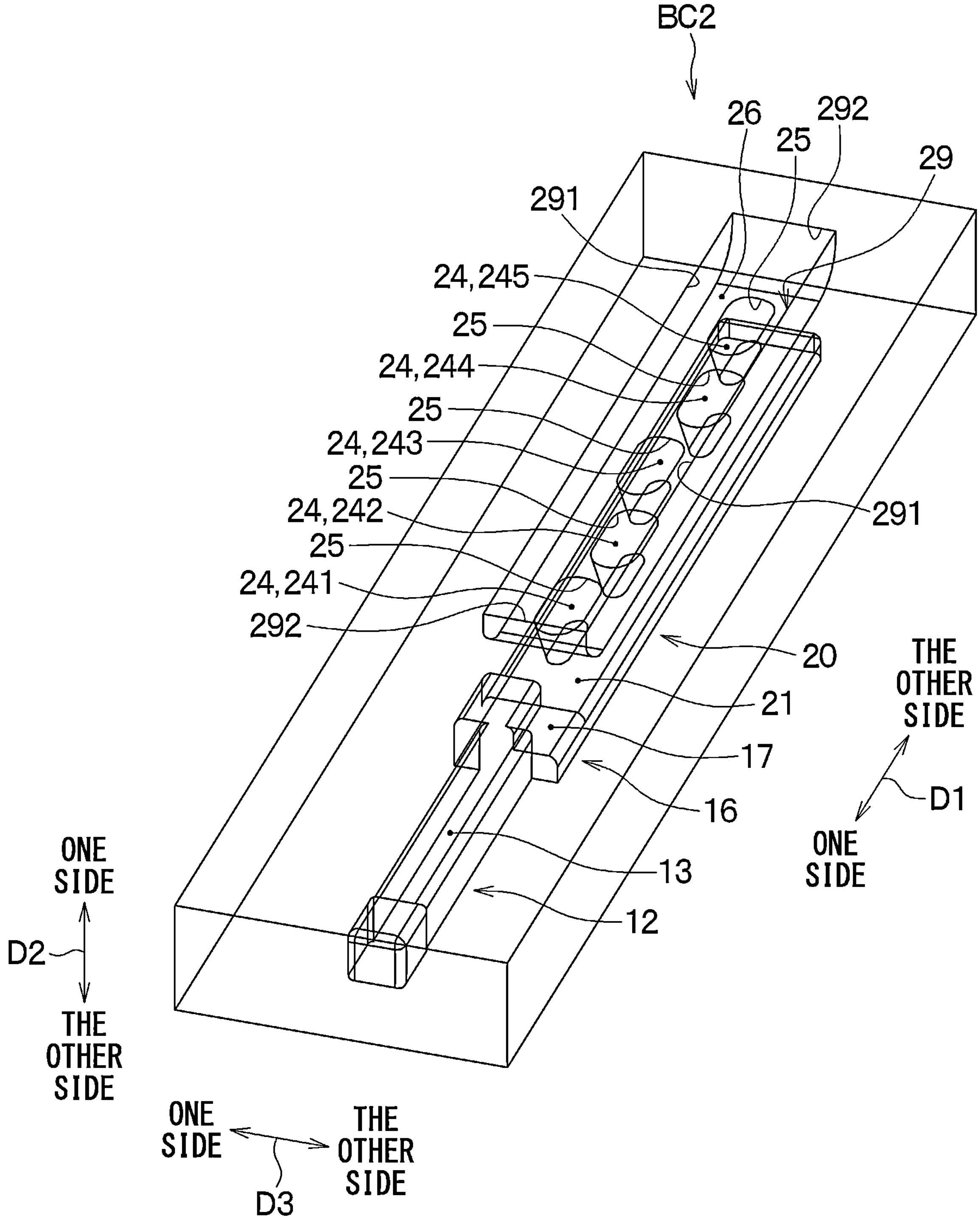
FIG. 23 is a perspective view showing the second block alone of the antenna device of the third embodiment in wire frame, corresponding to FIG. 19.

The open-space side surface 29 is similar to the open-space side surface 28 of the second embodiment, except for what has been described in this embodiment. In this embodiment, the cross-sectional view taken along line XVa-XVa in FIG. 20 is similar to FIG. 15. The cross-sectional view taken along line XVIa-XVIa in FIG. 20 is similar to FIG. 16. The perspective view in which the first block BC1 alone in this embodiment is displayed as a wire frame is similar to FIG. 18.

(1) According to this embodiment, the open-space side surface 29 is provided on one side of the multiple antenna apertures 24 in the height direction D2. The open-space side surface 29 surrounds the antenna apertures 24 collectively in a plan view, to form a ring shape, and is formed facing inward of the ring shape. As a result, radio waves are concentrated in the open space 26 formed inside the open-space side surface 29, making it possible to improve the gain of the antenna device 1.

Aside from the above-described aspects, the present embodiment is similar to the second embodiment. Further, in the present embodiment, effects similar to those of the second embodiment can be obtained in the same manner as in the second embodiment.

Though the present embodiment is a modification based on the second embodiment, the present embodiment can also be combined with the first embodiment.

Fourth Embodiment

A fourth embodiment is described next. The present embodiment will be explained mainly with respect to portions different from the third embodiment.

Figure 24:
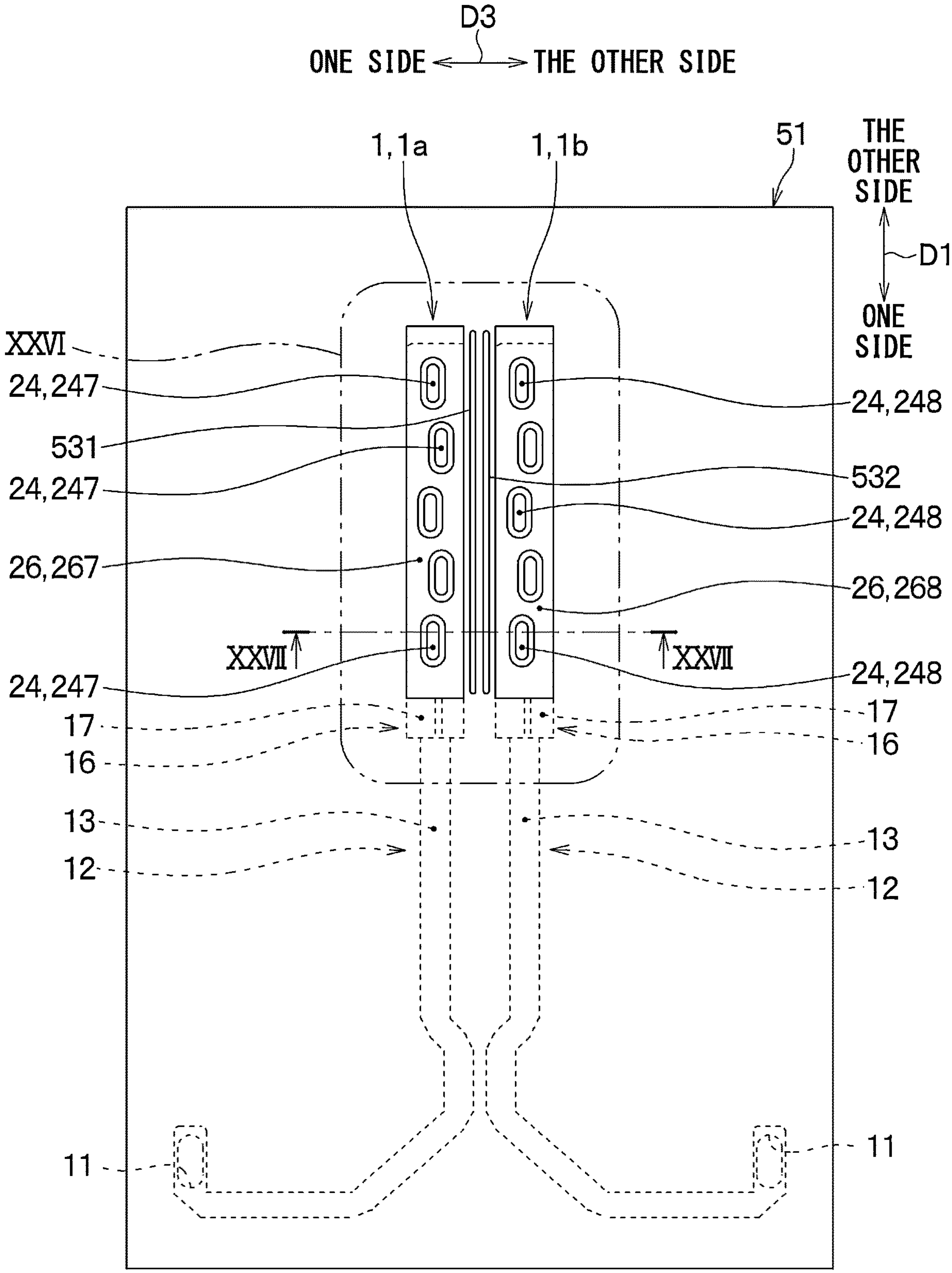
FIG. 24 is a plan view showing an array antenna including plural antenna devices in a fourth embodiment.
Figure 25:
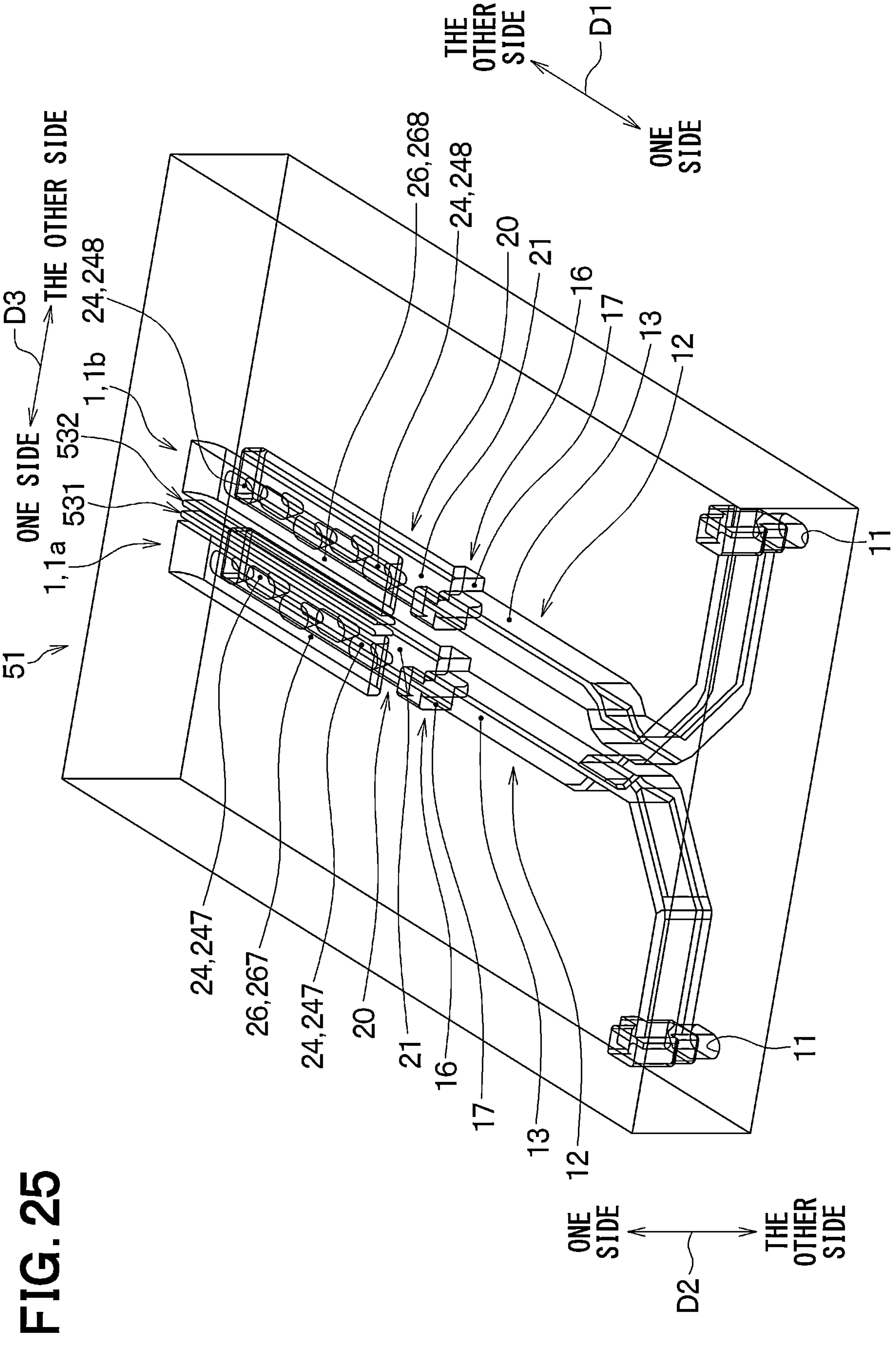
FIG. 25 is a perspective view showing the array antenna of FIG. 24 in wire frame.

As shown in FIGS. 24 and 25, in this embodiment, two antenna devices 1 are provided. The two antenna devices 1 are arranged in an array, and are integrated to form an array antenna 51.

In each of the two antenna devices 1 of the present embodiment, the first waveguide 13 is extended longer than that in the antenna device 1 of the third embodiment, and is bent, in a plan view, at a location away from the conversion space 17. Except for this, each of the two antenna devices 1 of this embodiment is similar to the antenna device 1 of the third embodiment.

In this embodiment, one of the two antenna devices 1 is referred to as a one-side antenna device 1*a*, and the other of the two antenna devices 1 is referred to as an other-side antenna device 1*b*. The antenna aperture 24 formed in the one-side antenna device 1*a* is referred to as a one-side antenna aperture 247, and the open space 26 formed in the one-side antenna device 1*a* is referred to as a one-side open space 267. The antenna aperture 24 formed in the other-side antenna device 1*b* is referred to as an other-side antenna aperture 248, and the open space 26 formed in the other-side antenna device 1*b* is referred to as an other-side open space 268.

The one-side antenna device 1*a* is disposed on one side of the other-side antenna device 1*b* in the width direction D3. The one-side antenna device 1*a* and the other-side antenna device 1*b* are configured symmetrically with respect to the width direction D3. Therefore, as shown in FIGS. 24 to 26, the multiple one-side antenna apertures 247 and the one-side open space 267 are arranged side by side on one side in the width direction D3 relative to the multiple other-side antenna apertures 248 and the other-side open space 268.

The array antenna 51 has an external exposed surface 52 that faces one side in the height direction D2 to be exposed to the external space SP, and is formed in a flat shape perpendicular to the height direction D2. The external exposed surface 52 is disposed between the one-side open space 267 and the other-side open space 268 in the width direction D3. Therefore, the external exposed surface 52 is disposed between the multiple one-side antenna apertures 247 and the multiple other-side antenna apertures 248 in the width direction D3. In other words, the one-side antenna apertures 247 and the other-side antenna apertures 248 are arranged side by side in the width direction D3 through the external exposed surface 52.

Figure 26:
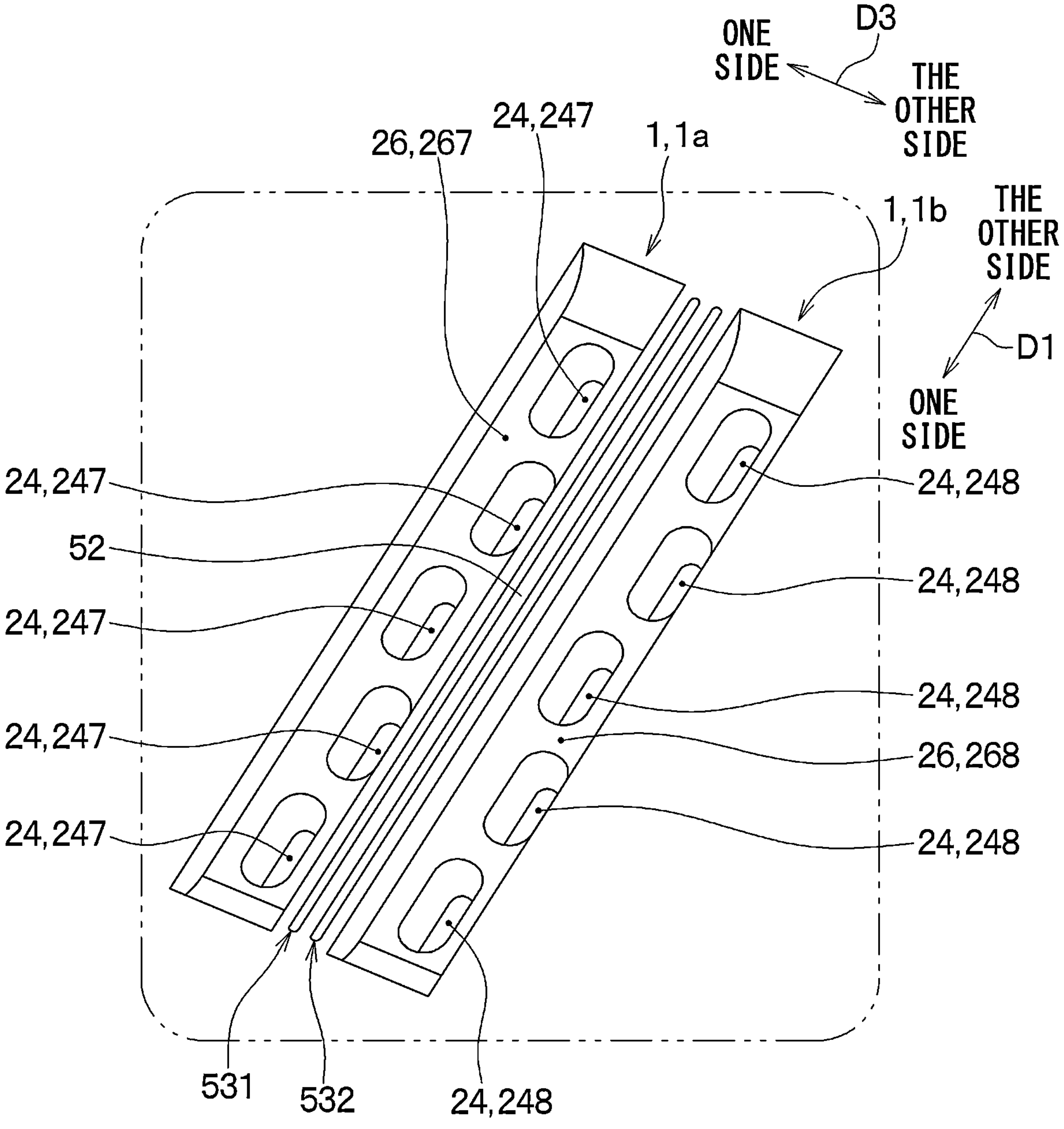
FIG. 26 is an enlarged perspective view of a portion XXVI of FIG. 24.
Figure 27:
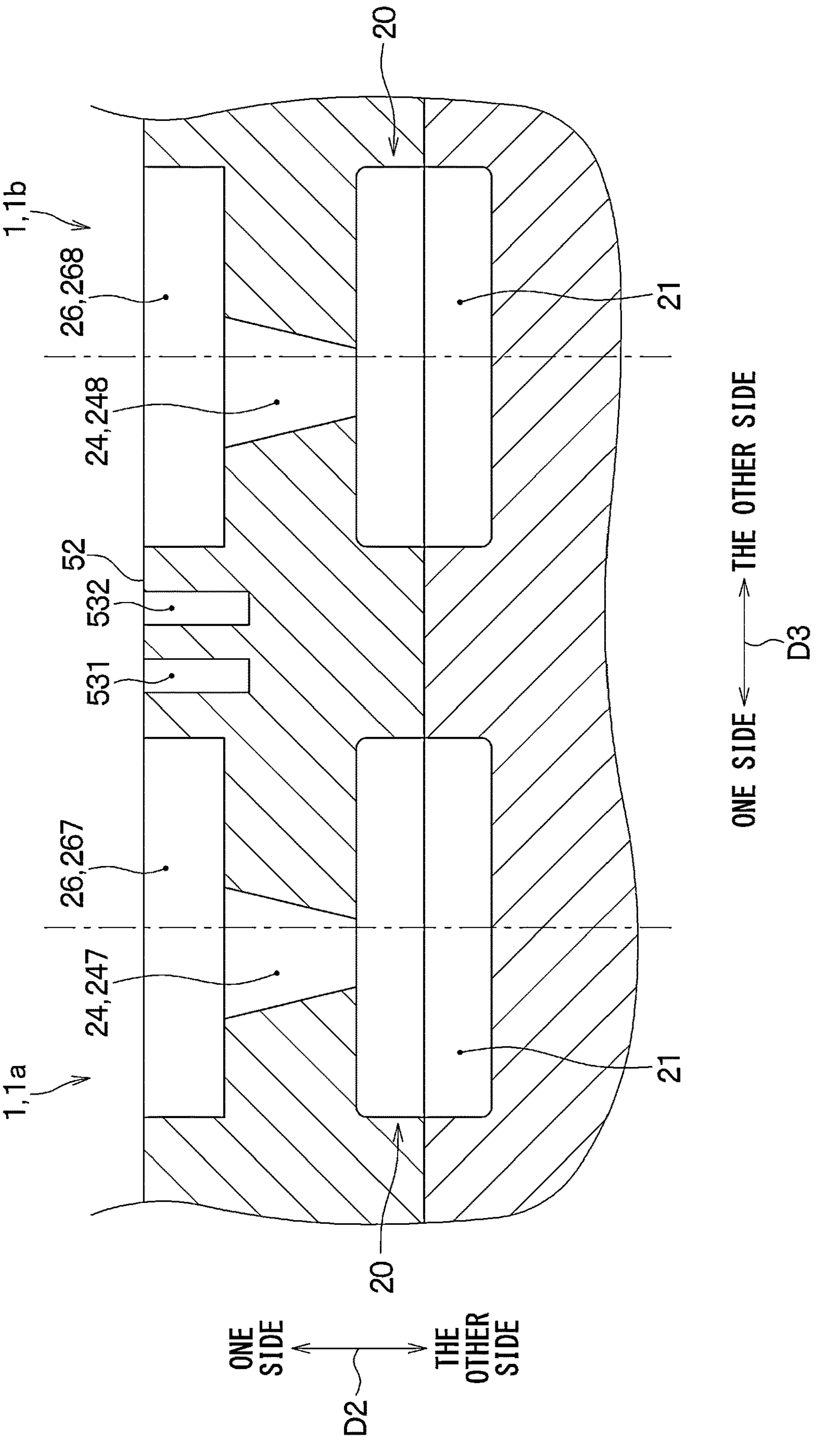
FIG. 27 is a cross-sectional view taken along line XVII-XVII of FIG. 24.

As shown in FIGS. 26 and 27, the external exposed surface 52 has two choke grooves 531 and 532. The choke groove 531, 532 is formed so that one side in the height direction D2 is open and the other side in the height direction D2 is the bottom, and extends in the longitudinal direction D1. Of the two choke grooves 531, 532, one choke groove 531 is disposed on one side of the other choke groove 532 in the width direction D3. In short, the two choke grooves 531, 532 are arranged in parallel in the width direction D3.

The two choke grooves 531, 532 are provided between the one-side open space 267 and the other-side open space 268 in the width direction D3, similar to the arrangement of the external exposed surface 52. That is, the two choke grooves 531, 532 are provided between the one-side antenna apertures 247 and the other-side antenna apertures 248 in the width direction D3.

Specifically, the two choke grooves 531 and 532 are configured to improve isolation of radio waves between the one-side antenna apertures 247 and the other-side antenna apertures 248. For example, the shape and arrangement of the choke grooves 531, 532 are determined by computer simulation or the like so as to improve the isolation of the radio waves, compared to a case where the choke groove 531, 532 is not present such that the external exposed surface 52 is simply flat.

According to this embodiment, the choke groove 531, 532 is provided between the one-side antenna aperture 247 and the other-side antenna aperture 248. Therefore, it is possible to improve the isolation of radio waves between the one-side antenna aperture 247 and the other-side antenna aperture 248, and to improve the gain in each of the one-side antenna device 1*a* and the other-side antenna device 1*b*.

Aside from the above-described aspects, the present embodiment is similar to the third embodiment. Thus, this embodiment can achieve the advantages obtained by the configuration common to the third embodiment in a similar manner as in the third embodiment.

This embodiment is a modification based on the third embodiment, but it is possible to combine this embodiment with the first embodiment or the second embodiment.

Fifth Embodiment

A fifth embodiment is described next. The present embodiment will be explained mainly with respect to portions different from the third embodiment.

Figure 28:
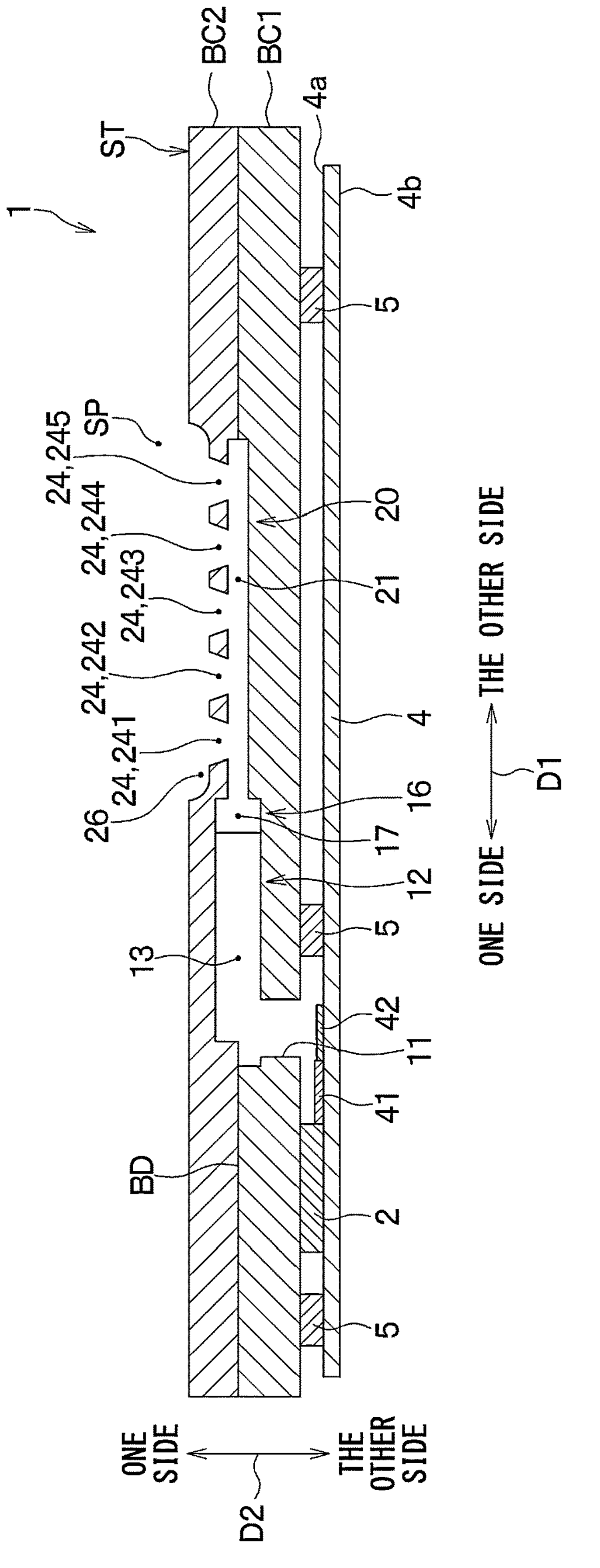
FIG. 28 is a schematic cross-sectional view illustrating an antenna device according to a fifth embodiment, corresponding to FIG. 1.

As shown in FIG. 28, in this embodiment, the MMIC 2 is mounted on one surface 4*a* of the electric board 4, not on the other surface 4*b* of the electric board 4. That is, a gap for placing the MMIC 2 is secured between the first block BC1 of the antenna device 1 and the one surface 4*a* of the electric board 4 due to the spacers 5, and the MMIC 2 is placed between the first block BC1 and the one surface 4*a* of the electric board 4. The solder Sd shown in FIG. 20 and the like is omitted in FIG. 28 and in FIGS. 29 to 31 described below.

Furthermore, in this embodiment, instead of the input/output unit 3 (see FIG. 20) of the MMIC 2 in the third embodiment, a connection wiring 41 and an input/output circuit 42 are provided on the electric board 4. The connection wiring 41 and the input/output circuit 42 are configured as a conductive wiring pattern formed on the one surface 4*a* of the electric board 4.

The connection wiring 41 is formed to be led out from the MMIC 2 along the one surface 4*a* of the electric board 4. One end of the connection wiring 41 is electrically connected to a terminal of the MMIC 2, and the other end is electrically connected to the input/output circuit 42.

The input/output circuit 42 transmits and receives radio waves to and from the external port 11 of the antenna device 1. The input/output circuit 42 functions in the same manner as the input/output unit 3 of the MMIC 2 in the third embodiment.

The external port 11 in this embodiment is disposed to face the input/output circuit 42. This allows radio waves to propagate between the external port 11 and the input/output circuit 42. In this embodiment, since the MMIC 2 is mounted on the one surface 4*a* of the electric board 4, the electric board 4 does not have a through hole SH (see FIG. 20).

Aside from the above-described aspects, the present embodiment is the same as the third embodiment. Thus, this embodiment can achieve the advantages obtained by the configuration common to the third embodiment in a similar manner as in the third embodiment.

Although the present embodiment is a modification based on the third embodiment, the present embodiment can be combined with the first, second and fourth embodiments.

Sixth Embodiment

A sixth embodiment is described next. This embodiment is explained mainly with respect to points different from those of the fifth embodiment.

Figure 29:
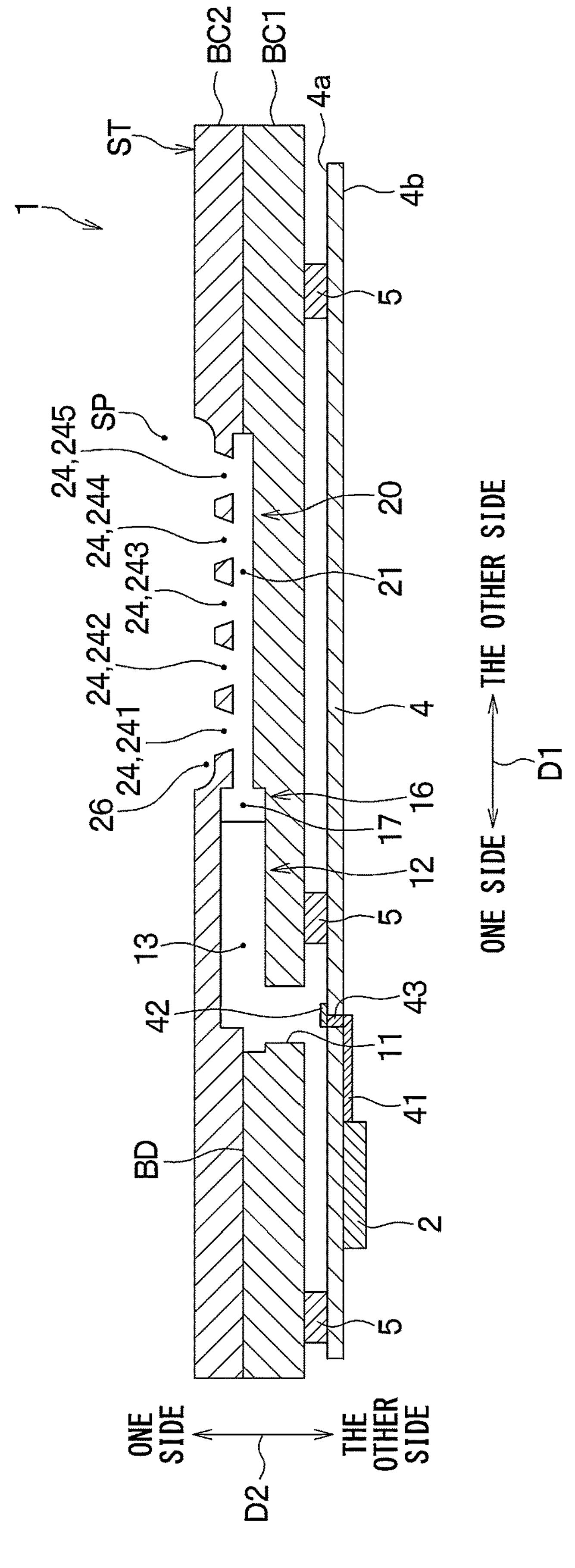
FIG. 29 is a schematic cross-sectional view illustrating an antenna device according to a sixth embodiment, corresponding to FIG. 28.

As shown in FIG. 29, the MMIC 2 is mounted on the other surface 4*b* of the electric board 4, not on the one surface 4*a* of the electric board 4.

The electric board 4 has the input/output circuit 42 formed on the one surface 4*a*, and the connection wiring 41 formed on the other surface 4*b*. The electric board 4 is provided with a connection portion 43 that penetrates the electric board 4 and electrically connects the connection wiring 41 and the input/output circuit 42. The connection portion 43 is formed by, for example, a through hole. The input/output circuit 42 and the connection wiring 41 are electrically connected via the connection portion 43.

This embodiment is similar to the fifth embodiment, except for the above-described aspects. Thus, this embodiment can achieve the advantages obtained by the configuration common to the fifth embodiment in a similar manner as in the fifth embodiment.

Seventh Embodiment

A seventh embodiment is described next. The present embodiment will be explained mainly with respect to portions different from those of the third embodiment.

Figure 30:
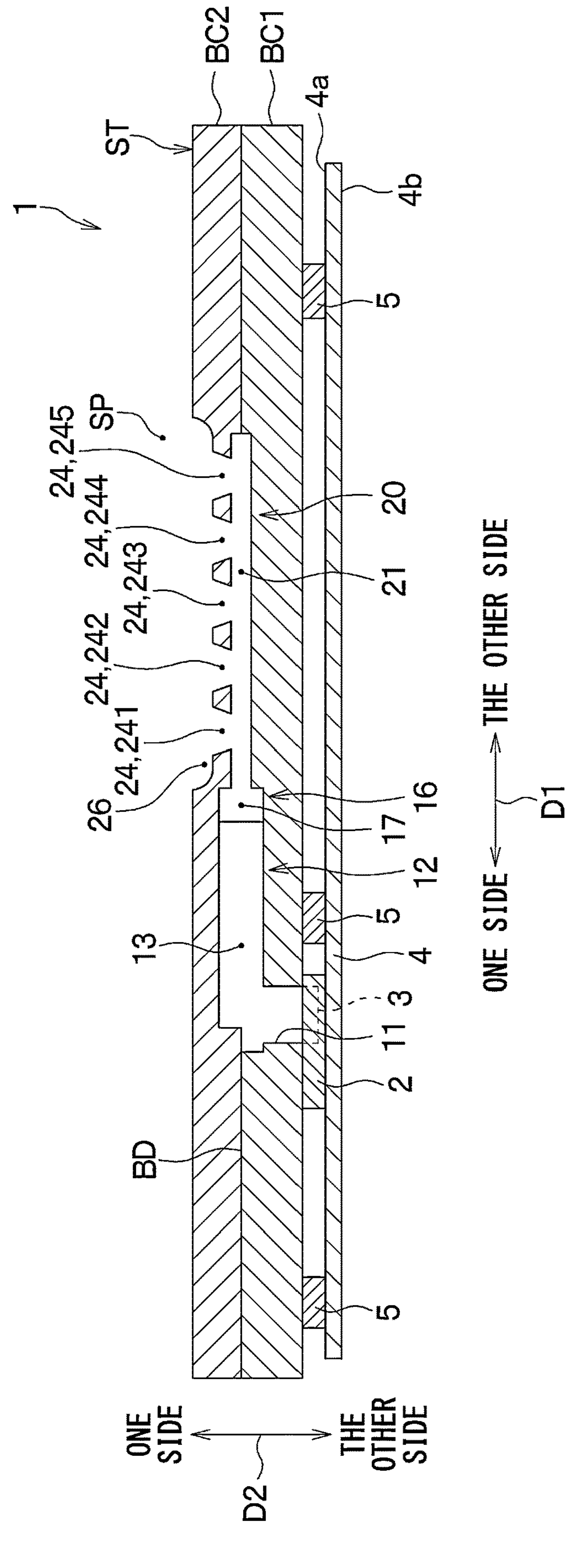
FIG. 30 is a schematic cross-sectional view illustrating an antenna device according to a seventh embodiment, corresponding to FIG. 28.

As shown in FIG. 30, in this embodiment, the MMIC 2 is mounted on the one surface 4*a* of the electric board 4, not on the other surface 4*b* of the electric board 4. That is, a gap for placing the MMIC 2 is secured between the first block BC1 of the antenna device 1 and the one surface 4*a* of the electric board 4 due to the spacers 5, and the MMIC 2 is placed between the first block BC1 and the one surface 4*a* of the electric board 4.

In this embodiment, similarly to the third embodiment, the external port 11 is disposed so as to face the input/output unit 3 of the MMIC 2. This allows radio waves to propagate between the external port 11 and the input/output unit 3 of the MMIC 2. However, in this embodiment, unlike the third embodiment, since the MMIC 2 is mounted on the one surface 4*a* of the electric board 4, the electric board 4 does not have a through hole SH (see FIG. 20).

Aside from the above-described aspects, the present embodiment is the same as the third embodiment. Thus, this embodiment can achieve the advantages obtained by the configuration common to the third embodiment in a similar manner as in the third embodiment.

Although the present embodiment is a modification based on the third embodiment, the present embodiment can be combined with the first, second and fourth embodiments.

Eighth Embodiment

An eighth embodiment is described next. The present embodiment will be explained primarily with respect to portions different from the sixth embodiment.

Figure 31:
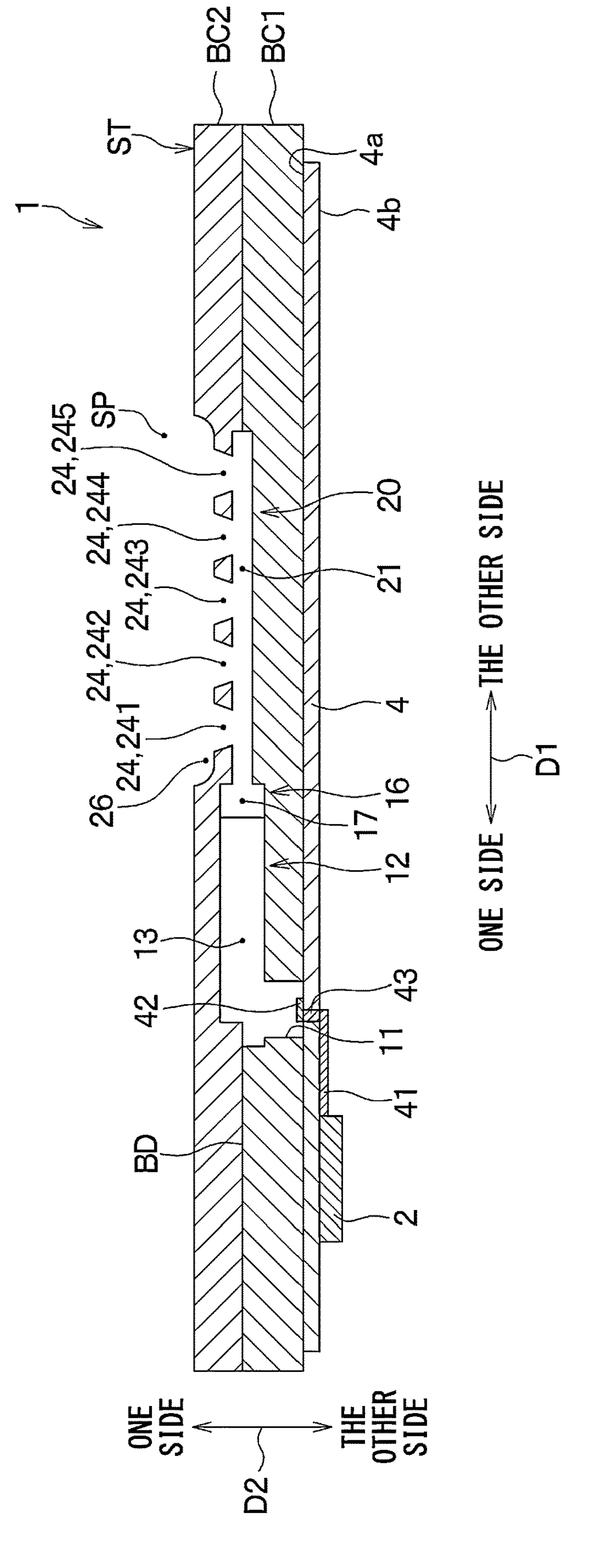
FIG. 31 is a schematic cross-sectional view illustrating an antenna device according to an eighth embodiment, corresponding to FIG. 28.

As shown in FIG. 31, in this embodiment, the spacer 5 (see FIG. 29) in the sixth embodiment is not provided. The antenna device 1 of this embodiment is disposed so that the first block BC1 is in contact with the one surface 4*a* of the electric board 4 without the spacer 5 therebetween. The MMIC 2 is mounted on the other surface 4*b* of the electric board 4.

An input/output circuit 42 is formed on the one surface 4*a* of the electric board 4, and a connection wiring 41 is formed on the other surface 4*b* of the electric board 4. The electric board 4 is provided with a connection portion 43 that penetrates the electric board 4 and electrically connects the connection wiring 41 and the input/output circuit 42. The connection portion 43 is formed by, for example, a through hole. The input/output circuit 42 and the connection wiring 41 are electrically connected via the connection portion 43.

Aside from the above-described aspects, the present embodiment is the same as the sixth embodiment. Further, in the present embodiment, effects similar to those of the sixth embodiment can be obtained in the same manner as in the sixth embodiment.

Ninth Embodiment

A ninth embodiment is described next. The present embodiment will be explained mainly with respect to portions different from the third embodiment.

Figure 32:
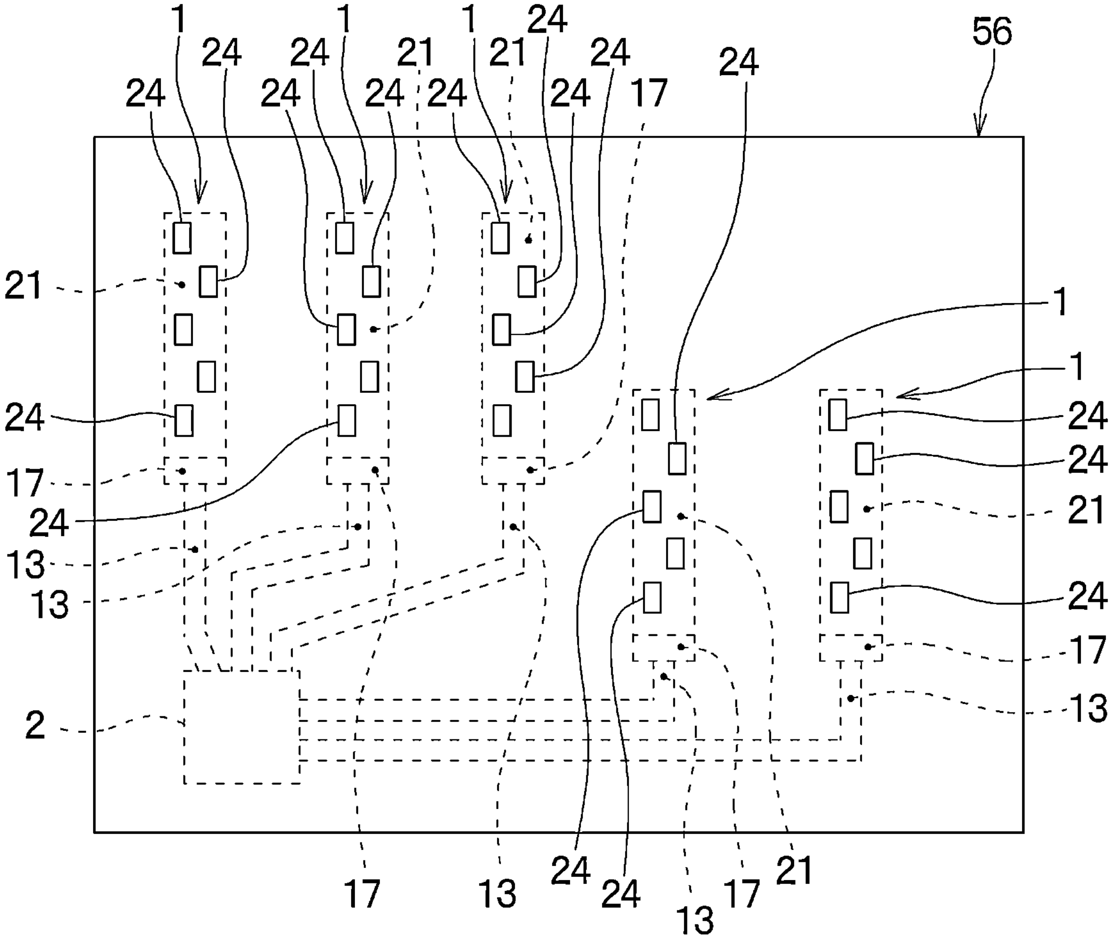
FIG. 32 is a schematic plan view of an apparatus including plural antenna devices in a ninth embodiment.

As shown in FIG. 32, an array antenna 56 in which the antenna devices 1 are arranged in an array can be used to transmit radio waves transmitted and received by the MMIC 2. The array antenna 56 can be realized, for example, by aggregating the first waveguides 13 of the antenna devices 1, toward the MMIC 2, to enable radio waves to propagate between each of the first waveguides 13 of the antenna devices 1 and the MMIC 2.

As described in the above embodiment, since the antenna device 1 can be downsized, a small array antenna 56 can be realized by using the multiple antenna devices 1. In addition, since the input/output unit 3 of the MMIC 2 can be connected to a large number of antenna apertures 24, the gain of the array antenna 56 can be increased.

In each antenna device 1, an open space 26 (see FIG. 20) may be formed similarly to the third embodiment, but in this embodiment, the open space 26 is not formed. Therefore, each antenna device 1 does not have the open-space bottom surface 27 and the open-space side surface 29 (see FIG. 20). Further, the antenna aperture 24 formed in each antenna device 1 of this embodiment has a rectangular shape extending in the longitudinal direction D1 in a plan view.

Aside from the above-described aspects, the present embodiment is the same as the third embodiment. Thus, this embodiment can achieve the advantages obtained by the configuration common to the third embodiment in a similar manner as in the third embodiment.

The present embodiment is a modification based on the third embodiment, but it is possible to combine the present embodiment with the first, second, and fourth to eighth embodiments.

Other Embodiments (1) In the first embodiment, as shown in FIGS. 6 and 9, the aperture peripheral surface 25 surrounding the antenna aperture 24 is an inclined surface linearly extending in both a cross-section perpendicular to the longitudinal direction D1 and a cross-section perpendicular to the width direction D3, but this is just one example. The aperture peripheral surface 25 does not have to be a linearly extending inclined surface in each cross-section, but may be, for example, a curved surface that is convexly or concavely curved so as to widen the antenna aperture 24 toward one side in the height direction D2.

Furthermore, the aperture peripheral surface 25 does not need to be inclined with respect to the height direction D2 in each of the cross-section perpendicular to the longitudinal direction D1 and the cross-section perpendicular to the width direction D3. For example, the aperture peripheral surface 25 may be along the height direction D2 in one of the cross-sections. Furthermore, it is also conceivable that the aperture peripheral surface 25 is a vertical surface along the height direction D2 over the entire periphery of the antenna aperture 24.

(2) In the first embodiment, as shown in FIGS. 6 and 9, the open-space side surface 28 surrounding the open space 26 is a vertical surface along the height direction D2.

However, this is just one example. For example, the open-space side surface 28 may be inclined with respect to the height direction D2 so that the open space 26 is wider toward one side in the height direction D2. Furthermore, in this case, the open-space side surface 28 may be a planar inclined surface, or may be a curved surface that is convexly or concavely curved in one or both of the cross-section perpendicular to the longitudinal direction D1 and the cross-section perpendicular to the width direction D3.

(3) In the first embodiment, the reflection suppressing wall 30 is formed in a rib shape as shown in FIG. 3, but this is just one example. The reflection suppressing wall 30 may have various shape. For example, any or all of the reflection suppressing walls 30 may be replaced with rod-shaped protrusions. Furthermore, various locations for arranging the reflection suppressing walls 30 can be envisaged.

(4) In the first embodiment, as shown in FIG. 2, the antenna aperture 24 has an elliptical shape in a plan view. However, the antenna aperture 24 may have a shape other than an elliptical shape, such as a rectangular shape.

(5) In the first embodiment, as shown in FIGS. 6 and 9, a minute gap is formed between the one side wall 30*a* and the other side wall 30*b* of the reflection suppressing wall 30 in the height direction D2. However, this is just one example. There may be no gap between the one side wall 30*a* and the other side wall 30*b*, and the one side wall 30*a* and the other side wall 30*b* may be continuous in the height direction D2.

(6) In the first embodiment, as shown in FIGS. 3 and 4, the multiple reflection suppressing walls 30 are arranged alternately on one side and the other side in the width direction D3 within the second waveguide 21. However, this is just one example. For example, the reflection suppressing walls 30 may be provided on both sides in the width direction D3 within the second waveguide 21 for each antenna aperture 24 that corresponds to that reflection suppressing wall 30.

(7) In the fourth embodiment, as shown in FIG. 26, two choke grooves 531, 532 are formed in the external exposed surface 52. However, it is also acceptable for the number of choke grooves 531, 532 formed in the external exposed surface 52 to be one.

(8) In the first embodiment, as shown in FIG. 3, five antenna apertures 24 are arranged in a row in the longitudinal direction D1, but the number of antenna apertures 24 may be four or less, or six or more.

(9) In the first embodiment, the first waveguide 13 extends linearly. However, the first waveguide 13 may extend while bending at a location away from the conversion space 17. In such a first waveguide 13, the longitudinal direction D1 is defined as a tangent direction to the central axis of the first waveguide 13. The same applies to the second waveguide 21.

(10) The antenna device 1 in each of the embodiments has the structural body ST in which two blocks BC1, BC2 are stacked in the height direction D2, but does not have to be composed of the structural body ST.

(11) In each of the embodiments, the MMIC 2 transmits and receives radio waves. However, this is merely an example, and the MMIC 2 may be configured to only transmit or receive radio waves. In other words, the MMIC 2 may be an electrical device that performs at least one of transmitting and receiving radio waves. The antenna device 1 can also be applied to devices that transmit and receive radio waves using transmitting and receiving equipment other than the MMIC 2.

(12) In each space formed within the antenna device 1, corners may or may not be rounded. This is because there is no substantial effect on the characteristics of the antenna device 1. The space formed within the antenna device 1 represents, for example, the external port 11, the first waveguide 13, the conversion space 17, the second waveguide 21, the antenna aperture 24, and the open space 26.

(13) In each of the embodiments, the conversion space 17 of the polarization conversion unit 16 has the shape shown in, for example, FIG. 3 or FIG. 5, but this is merely an example. The conversion space 17 may have various structures. For example, the conversion space 17 may be formed like a twisted waveguide having a rectangular cross-section and extending in the longitudinal direction D1 while being twisted 90 degrees around an axis along the longitudinal direction D1.

(14) In the first embodiment, as shown in FIGS. 1 to 3, the reflection suppressing walls 30 are respectively arranged to the antenna apertures 24. The number of the reflection suppressing walls 30 is the same as the number of antenna apertures 24, but this is just one example. For example, it is also possible that at least one of the first to fifth reflection suppressing walls 301 to 305 is not provided. Therefore, it is acceptable to say that the reflection suppressing wall 30 is disposed in correspondence with at least one of the antenna apertures 241 to 245. That is, it is possible that only one or two to four of the first to fifth reflection suppressing walls 301 to 305 are provided.

(15) The present disclosure is not limited to the above-described embodiments, and can be implemented in various modifications. In addition, the embodiments described above are not unrelated to each other, and can be appropriately combined unless the combination is obviously impossible.

Individual elements or features of a particular embodiment are not necessarily essential unless it is specifically stated that the elements or the features are essential in the foregoing description, or unless the elements or the features are obviously essential in principle. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when referring to the material, shape, positional relationship, and the like of the components and the like, except in the case where the components are specifically specified, and in the case where the components are fundamentally limited to a specific material, shape, positional relationship, and the like, the components are not limited to the material, shape, positional relationship, and the like.

According to another viewpoint, the array antenna 51 includes: the one-side antenna device 1*a* and the other-side antenna device 1*b*, each of which being the antenna device according to the above viewpoint; and the external exposed surface 52 facing the one side in the second direction and exposed to the external space. The external exposed surface is interposed between the one-side antenna aperture 247 which is the plurality of antenna apertures provided in the one-side antenna device and the other-side antenna aperture 248 which is the plurality of antenna apertures provided in the other-side antenna device in the third direction. The external exposed surface has a choke groove 531, 532 provided between the one-side antenna aperture and the other-side antenna aperture in the third direction to extend in the first direction. The choke groove includes one groove or two grooves in parallel, so as to improve radio wave isolation between the one-side antenna aperture and the other-side antenna aperture.

What is claimed is:

1. An antenna device comprising:

a monolithic microwave integrated circuit (MMIC);

a polarization conversion unit electrically connected to the MMIC, a conversion space is formed in the polarization conversion unit to propagate radio wave;

a first waveguide section in which a first waveguide is formed to be connected to the conversion space from one side in a first direction and extend from the conversion space to the one side in the first direction so as to propagate the radio wave; and a second waveguide section in which a second waveguide and a plurality of antenna apertures are formed, wherein the second waveguide is connected to the conversion space from another side and extends from the conversion space to the other side so as to propagate the radio wave, the plurality of antenna apertures is connected to the second waveguide from one side in a second direction perpendicular to the first direction, the plurality of antenna apertures is arranged side by side in the first direction and open to an external space by facing the one side in the second direction, the conversion space has one end provided on the one side in the first direction and connected to the first waveguide, and another end provided on the other side and connected to the second waveguide, the polarization conversion unit propagates the radio wave between the one end and the other end of the conversion space, and changes an oscillation direction of electric field of the radio wave so that the electric field of the radio wave oscillates in a third direction perpendicular to the first direction and the second direction at the one end of the conversion space and oscillates in the second direction at the other end of the conversion space, the first waveguide has a first shape extended in the second direction in a cross-section perpendicular to the first direction, and the second waveguide has a second shape extended in the third direction in the cross-section.

2. The antenna device according to claim 1, wherein each of the plurality of antenna apertures is formed as a hole expanding as extending toward the one side in the second direction.

3. The antenna device according to claim 1, wherein the second waveguide section has a plurality of aperture peripheral surfaces provided on the one side of the plurality of antenna apertures in the second direction, and the aperture peripheral surface surrounds a corresponding antenna aperture, when viewed in the second direction, to form an annular shape, and is formed facing inward of the annular shape.

4. The antenna device according to claim 1, wherein the second waveguide section has an aperture peripheral surface provided on the one side of the plurality of antenna apertures in the second direction, and the aperture peripheral surface forms an annular shape that surrounds the plurality of antenna apertures when viewed in the second direction, and is formed facing inward of the annular shape.

5. The antenna device according to claim 1, wherein the second waveguide section includes at least one protrusion provided in the second waveguide to protrude from a wall surface of the second waveguide to suppress reflection of the radio wave in the second waveguide, and the protrusion is disposed corresponding to at least one of the plurality of antenna apertures.

6. The antenna device according to claim 5, wherein the plurality of antenna apertures is arranged in the first direction while being alternately biased toward one side and the other side in the third direction with respect to a central axis of the second waveguide extending in the first direction, and the protrusion is arranged offset in the third direction with respect to the central axis of the second waveguide and located opposite to the antenna aperture.

7. The antenna device according to claim 5, wherein the protrusion is positioned at least partially within a range occupied by the antenna aperture in the first direction, to which the protrusion corresponds, and is positioned biased toward the other side in the first direction relative to the antenna aperture to which the protrusion corresponds.

8. The antenna device according to claim 5, wherein a certain antenna aperture of the plurality of antenna apertures is arranged closest to a certain protrusion of the at least one protrusion when viewed in the third direction such that the certain protrusion is disposed corresponding to the certain antenna aperture.

9. The antenna device according to claim 1, wherein the first waveguide propagates the radio wave between an electric device that transmits and/or receives the radio wave and the conversion space.

* * * * *